(12) United States Patent
Manolakos et al.

(10) Patent No.: US 11,576,060 B2
(45) Date of Patent: Feb. 7, 2023

(54) MAXIMUM NUMBER OF PATH LOSS OR UPLINK SPATIAL TRANSMIT BEAM REFERENCE SIGNALS FOR DOWNLINK OR UPLINK POSITIONING REFERENCE SIGNALS

(71) Applicant: QUALCOMM Incorporated, San Diego, CA (US)

(72) Inventors: Alexandros Manolakos, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 16/871,889

(22) Filed: May 11, 2020

(65) Prior Publication Data
US 2020/0382978 A1 Dec. 3, 2020

(30) Foreign Application Priority Data

May 30, 2019 (GR) .............................. 20190100236

(51) Int. Cl.
*H04W 24/08* (2009.01)
*H04L 5/00* (2006.01)
(Continued)

(52) U.S. Cl.
CPC .......... *H04W 24/08* (2013.01); *H04L 5/0048* (2013.01); *H04W 64/00* (2013.01); *H04W 4/029* (2018.02)

(58) Field of Classification Search
CPC ...... H04W 24/08; H04W 64/00; H04L 5/0048
See application file for complete search history.

(56) References Cited

U.S. PATENT DOCUMENTS 10,945,218 B2  3/2021 Chen et al.
2013/0065612 A1* 3/2013 Siomina ................ H04W 24/02
455/456.2
(Continued)

FOREIGN PATENT DOCUMENTS

EP  3886484 A1  9/2021
EP  3973736 A1  3/2022
(Continued)

OTHER PUBLICATIONS

LG Electronics: "Discussion on Necessity and Details for Physical-layer Procedures to Support UE/gNB measurements", 3GPP TSG RAN WG1 #97, R1-1906722, May 13-17, 2019, 9 pages.
(Continued)

*Primary Examiner* — Kevin C. Harper
(74) *Attorney, Agent, or Firm* — Qualcomm Incorporated

(57) ABSTRACT

Disclosed are techniques for wireless communication. In an aspect, a user equipment (UE) receives, via one or more component carriers, one or more downlink reference signals from one or more serving or neighboring transmission-reception points (TRPs), wherein a number of the received one or more downlink reference signals is less than or equal to a maximum number of downlink path loss estimates, spatial transmit beam determinations, spatial receive beam determinations, or any combination thereof to be simultaneously maintained by the UE for positioning purposes, and wherein the maximum number does not include any downlink reference signals the UE is already monitoring for other purposes, and performs a downlink path loss estimate, a spatial transmit beam determination, a spatial receive beam determination, or any combination thereof at least based on each of the received one or more downlink reference signals.

80 Claims, 13 Drawing Sheets

(51) Int. Cl.
*H04W 64/00* (2009.01)
*H04W 4/029* (2018.01)

(56) References Cited

U.S. PATENT DOCUMENTS

| | | | |
|---|---|---|---|
| 2013/0286960 A1 | | 10/2013 | Li et al. |
| 2013/0310077 A1* | | 11/2013 | Siomina ............... H04W 4/029 |
| | | | 455/456.2 |
| 2015/0011236 A1* | | 1/2015 | Kazmi ................. G01S 5/0226 |
| | | | 455/456.1 |
| 2016/0227524 A1 | | 8/2016 | Choi et al. |
| 2018/0332625 A1 | | 11/2018 | Tsai |
| 2019/0081753 A1 | | 3/2019 | Jung et al. |
| 2019/0104477 A1 | | 4/2019 | Molavianjazi et al. |
| 2019/0141643 A1 | | 5/2019 | Molavianjazi et al. |
| 2019/0306739 A1* | | 10/2019 | Kim .................... H04W 52/0229 |
| 2019/0349866 A1* | | 11/2019 | Lin ..................... H04W 52/146 |
| 2020/0374806 A1 | | 11/2020 | Manolakos et al. |

FOREIGN PATENT DOCUMENTS

| | | |
|---|---|---|
| WO | 2018232245 A1 | 12/2018 |
| WO | 2020236780 A1 | 11/2020 |

OTHER PUBLICATIONS

International Search Report and Written Opinion—PCT/US2020/032451—ISA/EPO—dated Jul. 31, 2020.
Motorola Mobility., et al., "On non-CA NR UL Power Control," 3GPP Draft, 3GPP TSG RAN WG1 #91, R1-1720928-Power-Control-Non-CA, 3rd Generation Partnership Project (3GPP), Mobile Competence Centre, 650, Route Des Lucioles, F-06921, Sophia-Antipolis Cedex, France, vol. RAN WG1. No. Reno. NV. USA; Nov. 27, 2017-Dec/ 1. 2017, Nov. 18, 2017 (Nov. 18, 2017), XP051370306, 12 pages, Retrieved from the Internet: URL: http://www.3gpp.org/ftp/tsg%5Fran/WG1%5FRL1/TSGR1%5F91/Docs/ [retrieved on Nov. 18, 2017], Section 4.
Zte, et al., "Offline summary of UL Power control—non-CA Aspects," 3GPP Draft, 3GPP-TSG RAN WG1 Meeting#91, R1-1721676, Offline Summary of UL Power Control—NONCA V7, 3rd Generation Partnership Project (3GPP), Mobile Competence Centre, 650, Route Des Lucioles, F-06921, Sophia-Antipolis Cedex, France, vol. RAN WG1. No. Reno. USA, Nov. 17, 2017-Dec. 1, 2017, Dec. 4, 2017 (Dec. 4, 2017), XP051370756, 65 pages, Retrieved from the Internet: URL: http://www.3gpp.org/ftp/tsg%5Fran/WG1%5FRL1/TSGR1%5F91/Docs/.
Intel Corporation: "Design of Downlink Reference Signals for NR Positioning", 3GPP TSG RAN WG1 Meeting #97, R1-1906821, Reno, USA, May 13-17, 2019, pp. 1-17.

* cited by examiner

MAXIMUM NUMBER OF PATH LOSS OR UPLINK SPATIAL TRANSMIT BEAM REFERENCE SIGNALS FOR DOWNLINK OR UPLINK POSITIONING REFERENCE SIGNALS

CROSS-REFERENCE TO RELATED APPLICATIONS

The present Application for Patent claims priority under 35 U.S.C. § 119 to Greek Patent Application No. 20190100236, entitled "MAXIMUM NUMBER OF PATH LOSS OR UPLINK SPATIAL TRANSMIT BEAM REFERENCE SIGNALS FOR DOWNLINK OR UPLINK POSITIONING REFERENCE SIGNALS," filed May 30, 2019, assigned to the assignee hereof, and expressly incorporated herein by reference in its entirety.

BACKGROUND OF THE DISCLOSURE

1. Field of the Disclosure

Aspects of the disclosure relate generally to telecommunications, and more particularly to determining the maximum number of path loss or uplink spatial transmit beam reference signals for downlink or uplink positioning reference signals.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) wireless standard, referred to as New Radio (NR), calls for higher data transfer speeds, greater number of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

To support position estimations in terrestrial wireless networks, a mobile device can be configured to measure and report the observed time difference of arrival (OTDOA) or reference signal timing difference (RSTD) between reference signals received from two or more network nodes (e.g., different base stations or different transmission points (e.g., antennas) belonging to the same base station).

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes receiving, via one or more component carriers, one or more downlink reference signals from one or more serving or neighboring transmission-reception points (TRPs), wherein a number of the received one or more downlink reference signals is less than or equal to a maximum number of downlink path loss estimates, spatial transmit beam determinations, spatial receive beam determinations, or any combination thereof to be simultaneously maintained by the UE for positioning purposes, and wherein the maximum number does not include any downlink reference signals the UE is already monitoring for other purposes, and performing a downlink path loss estimate, a spatial transmit beam determination, a spatial receive beam determination, or any combination thereof at least based on each of the received one or more downlink reference signals.

In an aspect, a UE includes a memory, at least one transceiver, and at least one processor communicatively coupled to the memory and the at least one transceiver, the at least one processor configured to receive, via the at least one transceiver on one or more component carriers, one or more downlink reference signals from one or more serving or neighboring TRPs, wherein a number of the received one or more downlink reference signals is less than or equal to a maximum number of downlink path loss estimates, spatial transmit beam determinations, spatial receive beam determinations, or any combination thereof to be simultaneously maintained by the UE for positioning purposes, wherein the maximum number does not include any downlink reference signals the UE is configured to monitor for other purposes, and perform a downlink path loss estimate, a spatial transmit beam determination, a spatial receive beam determination, or any combination thereof at least based on each of the received one or more downlink reference signals.

In an aspect, a UE includes means for receiving, via one or more component carriers, one or more downlink reference signals from one or more serving or neighboring TRPs, wherein a number of the received one or more downlink reference signals is less than or equal to a maximum number of downlink path loss estimates, spatial transmit beam determinations, spatial receive beam determinations, or any combination thereof to be simultaneously maintained by the UE for positioning purposes, and wherein the maximum number does not include any downlink reference signals the UE is already monitoring for other purposes, and means for performing a downlink path loss estimate, a spatial transmit beam determination, a spatial receive beam determination, or any combination thereof at least based on each of the received one or more downlink reference signals.

In an aspect, a non-transitory computer-readable medium storing computer-executable instructions includes computer-executable instructions comprising at least one instruction instructing a UE to receive, via one or more component carriers, one or more downlink reference signals from one or more serving or neighboring TRPs, wherein a number of the received one or more downlink reference signals is less than or equal to a maximum number of downlink path loss estimates, spatial transmit beam determinations, spatial receive beam determinations, or any combination thereof to be simultaneously maintained by the UE for positioning purposes, and wherein the maximum number does not include any downlink reference signals the UE is already monitoring for other purposes, and at least one instruction instructing the UE to perform a downlink path loss estimate, a spatial transmit beam determination, a spatial receive beam determination, or any combination thereof at least based on each of the received one or more downlink reference signals.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
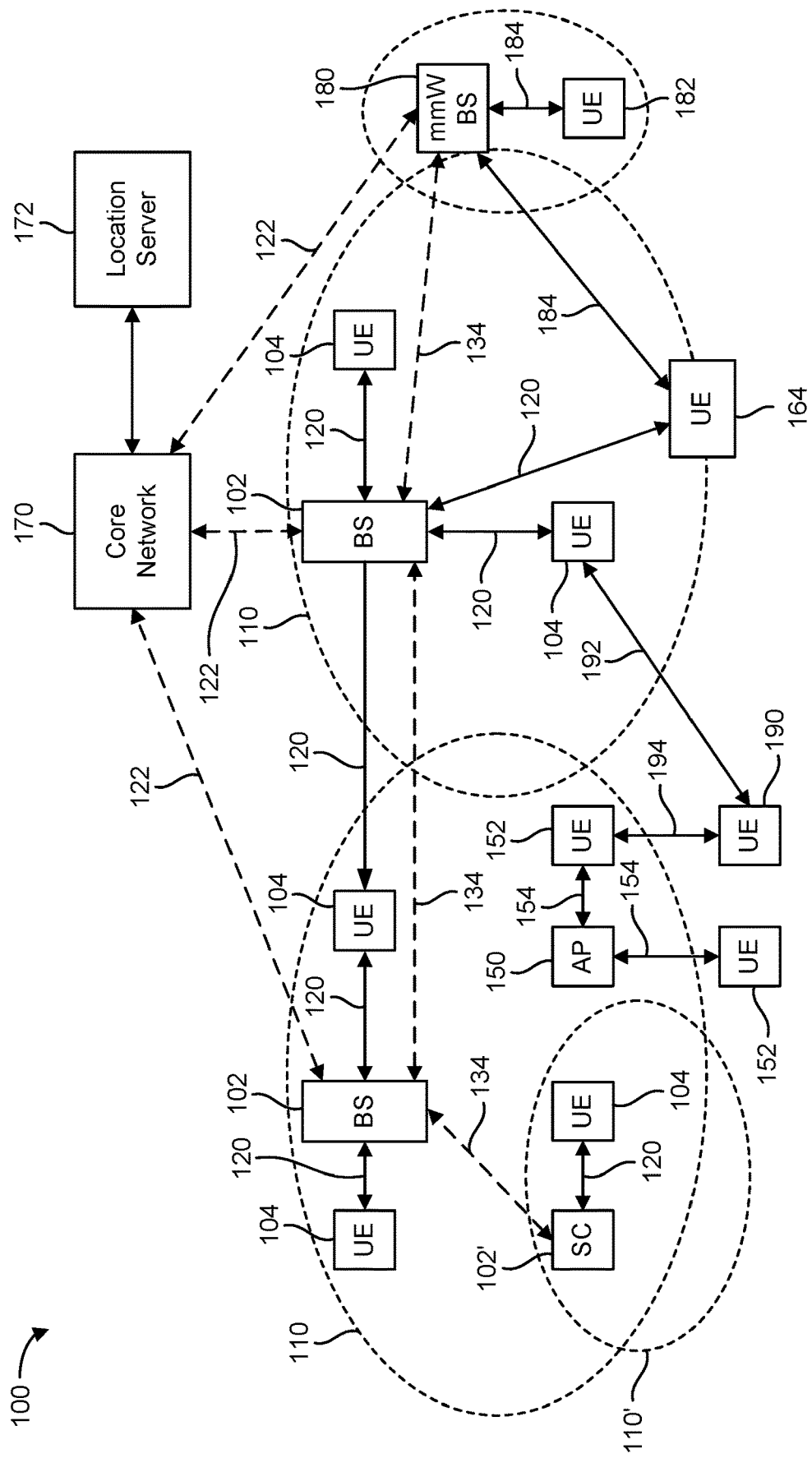
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send radio frequency (RF) signals to a base station is called an uplink (UL) channel (e.g., a reverse traffic channel, a reverse control channel, an access channel, etc.). A communication link through which the base station can send RF signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna or antenna array of the base station corresponding to a cell of the base station. Where the term "base station" refers to multiple co-located physical TRPs, the physical TRPs may be different antennas or arrays of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference signals the UE is measuring. Because a TRP is the point from which a base station transmits and receives RF signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. In the following description, references to "signals" (e.g., reference signals, positioning reference signals, etc.) are assumed to be references to RF signals, even if the term "RF signal" is not used.

According to various aspects, FIG. 1 illustrates an exemplary wireless communications system 100. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs where the wireless communications system 100 corresponds to an LTE network, or gNBs where the wireless communications system 100 corresponds to a NR network, or a combination of both, and the small cell base stations 102' may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 and geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss (or path attenuation), which is the reduction in power density (attenuation) of an electromagnetic wave as it propagates through space, and a relatively short range. Path loss is also influenced by terrain contours, environment (e.g., urban or rural, vegetation and foliage, etc.), propagation medium (e.g., dry or moist air), the distance between the transmitter and the receiver, and the height and location of the transmit antenna(s). Path loss may be due to many effects, such as free-space loss, refraction, diffraction, reflection, aperture-medium coupling loss, and absorption. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference signal on a second beam can be derived from information about a source reference signal on a source beam. Thus, if the source reference signal is QCL Type A, the receiver can use the source reference signal to estimate the Doppler shift, Doppler spread, average delay, and delay spread of a second reference signal transmitted on the same channel. If the source reference signal is QCL Type B, the receiver can use the source reference signal to estimate the Doppler shift and Doppler spread of a second reference signal transmitted on the same channel. If the source reference signal is QCL Type C, the receiver can use the source reference signal to estimate the Doppler shift and average delay of a second reference signal transmitted on the same channel. If the source reference signal is QCL Type D, the receiver can use the source reference signal to estimate the spatial receive parameter of a second reference signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

Because communication at high mmW frequencies utilizes directionality (e.g., communication via directional beams) to compensate for higher propagation loss, a base station (e.g., mmW base station 180) and a UE (e.g., UE 182) may need to align their transmit and receive beams during both initial network access (e.g., during a random access procedure) and subsequent data transmissions to ensure maximum gain. The base station and the UE may determine the best beams for communicating with each other based on the QCL type, and the subsequent communications between the base station and the UE may be via the selected beams. However, due to UE mobility/movement, beam reconfiguration at the base station, and/or other factors, a downlink beam (e.g., comprising a downlink control link), which may have been the preferred active beam, may fail to be detected at the UE, or the signal quality may fall below a threshold, causing the UE to consider it as a beam/link failure.

A beam recovery procedure may be employed to recover from a beam failure. A beam failure may refer to, for example, failure to detect a strong (e.g., with signal power greater than a threshold) active beam, which may, in some aspects, correspond to a control channel communicating control information from the network. In certain aspects, in order to facilitate beam failure detection, the UE may be preconfigured with beam identifiers (IDs) of a first set of beams (referred to as "set_q0") to be monitored, a monitoring period, a signal strength threshold, etc. The recovery may be triggered when a signal strength associated with the one or more monitored beams (as detected by the UE) falls below a threshold. The recovery process may include the UE identifying a new beam, for example, from a second set of possible beams (corresponding to beam IDs that may be included in a second set, referred to as "set_q1"), and performing a random access channel (RACH) procedure (also referred to as a "random access procedure") using preconfigured time and frequency resources corresponding to the new preferred beam. The beam IDs corresponding to the beams in the second set of beams (set_q1) may be preconfigured at the UE for use for beam failure recovery purposes.

For example, the UE may monitor downlink beams (based on the beam IDs and resources identified in the second set), perform measurements, and determine (e.g., based on the measurements) which beam out of all received and measured beams may be the best for reception at the UE from the UE perspective.

If beam correspondence is assumed (i.e., the direction of the best receive beam used by the UE is also considered the best direction for the transmit beam used by the UE), then the UE may assume the same beam configuration for both reception and transmission. That is, based on monitoring downlink reference signals from the base station, the UE can determine its preferred uplink beam weights, which will be the same as for the beam used for receiving the downlink reference signals.

Where beam correspondence is not assumed (e.g., deemed not suitable in the given scenario or for other reasons), the UE may not derive the uplink transmit beam from the downlink receive beam. Instead, separate signaling is needed to select the uplink and downlink beam weights and for the uplink-downlink beam pairing. The UE may perform a RACH procedure (e.g., using the preconfigured time and frequency resources indicated in the second set of beams, set_q1) for identifying the uplink transmit beam. Performing the RACH procedure using the preconfigured time and frequency resources may comprise, for example, transmitting a RACH preamble on one or more beams (corresponding to the beam IDs in the second set of beams) on allocated RACH resources corresponding to the one or more beams. Based on the RACH procedure, the UE may be able to determine and confirm with the base station which uplink direction may be the best beam direction for an uplink channel. In this manner, both uplink and downlink beams may be reestablished, and beam recovery may be completed.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In order to operate on multiple carrier frequencies, a UE may be equipped with multiple receivers and/or transmitters. The carrier frequency to which a receiver/transmitter of the UE is currently tuned is referred to as an "active carrier frequency" or simply an "active carrier." For example, a UE may have two receivers, Receiver 1 and Receiver 2, where Receiver 1 is a multi-band receiver that can be tuned to band (i.e., carrier frequency) X or band Y, and Receiver 2 is a one-band receiver tuneable to band Z only. In this example, if the UE is being served in band X, band X would be referred to as the "primary serving cell" or "active carrier frequency," and Receiver 1 would need to tune from band X to band Y (referred to as a "secondary serving cell") in order to measure band Y (and vice versa). In contrast, whether the UE is being served in band X or band Y, the UE can measure band Z without interrupting the service on band X or band Y.

In an intra-RAT multi-carrier system (also known as single RAT multi-carrier system), all the component carriers belong to the same RAT, for example, a frequency division duplex (FDD) multi-carrier system or a time division duplex (TDD) multi-carrier system. In a multi-carrier system, such as NR, it is possible to aggregate a different number of component carriers of different bandwidths and possibly in different frequency bands in the uplink and the downlink. One of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164, and the mmW base station 180 may support one or more SCells for the UE 164.

Figure 2A:
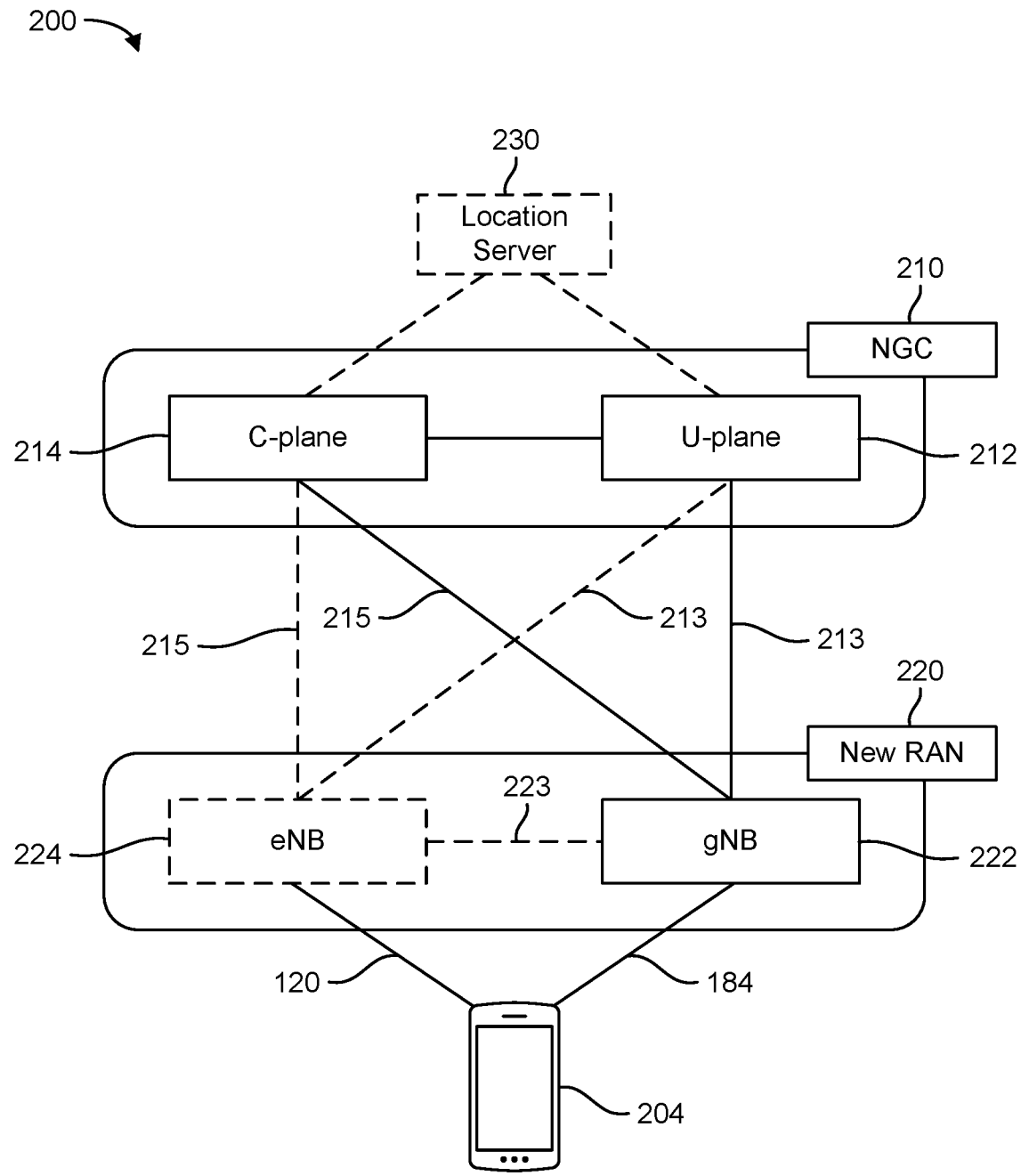
FIGS. 2A and 2B illustrate example wireless network structures, according to various aspects.

According to various aspects, FIG. 2A illustrates an exemplary wireless network structure 200. For example, an NGC 210 (also referred to as a "5GC") can be viewed functionally as control plane functions (C-plane) 214 (e.g., UE registration, authentication, network access, gateway selection, etc.) and user plane functions (U-plane) 212 (e.g., UE gateway function, access to data networks, IP routing, etc.), which operate cooperatively to form the core network. User plane interface (NG-U) 213 and control plane interface (NG-C) 215 connect the gNB 222 to the NGC 210 and specifically to the user plane functions 212 and control plane functions 214, respectively. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
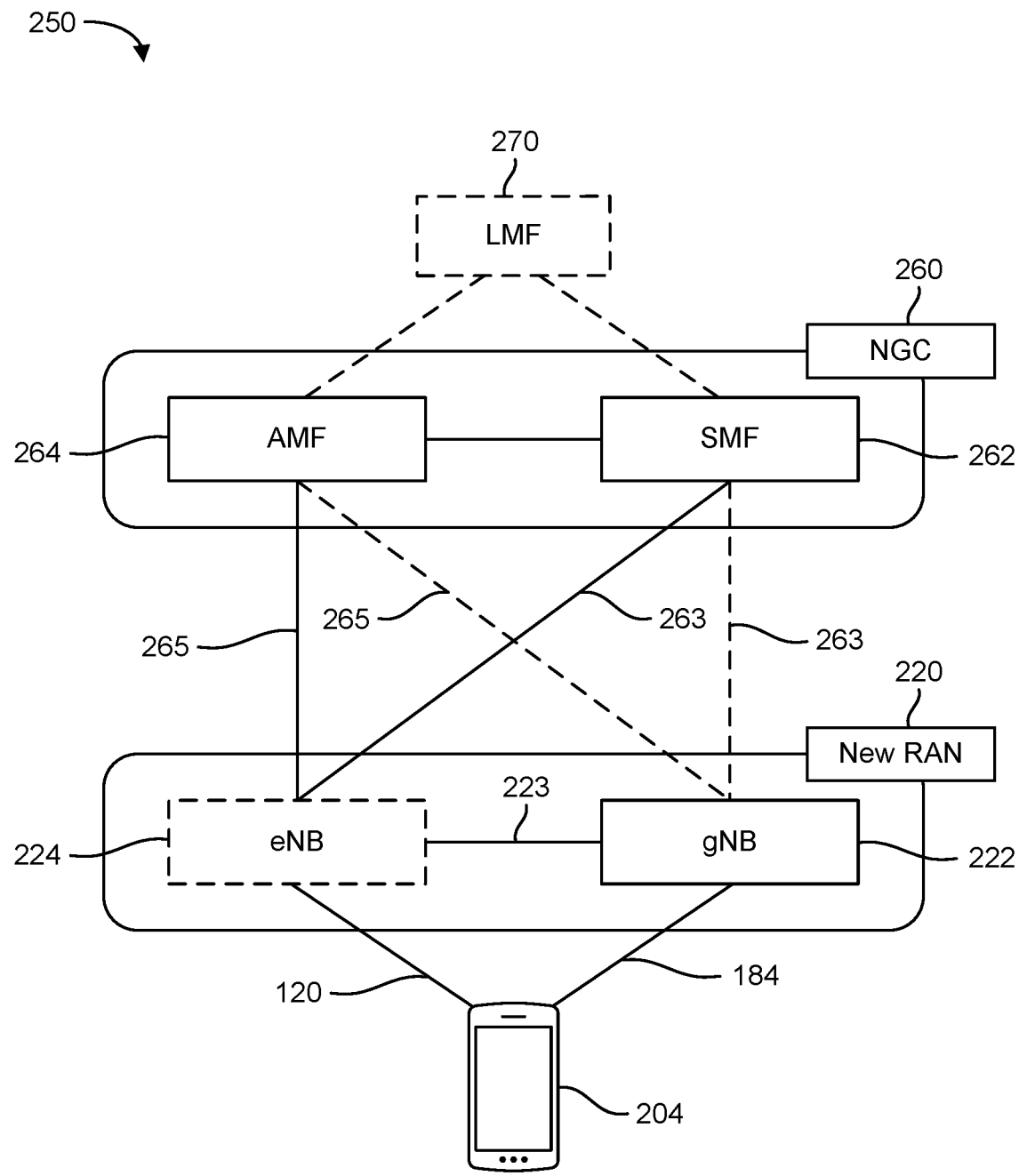

According to various aspects, FIG. 2B illustrates another exemplary wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 may communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), uplink traffic verification (service data flow (SDF) to QoS flow mapping), transport level packet marking in the uplink and DL, downlink packet buffering and downlink data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
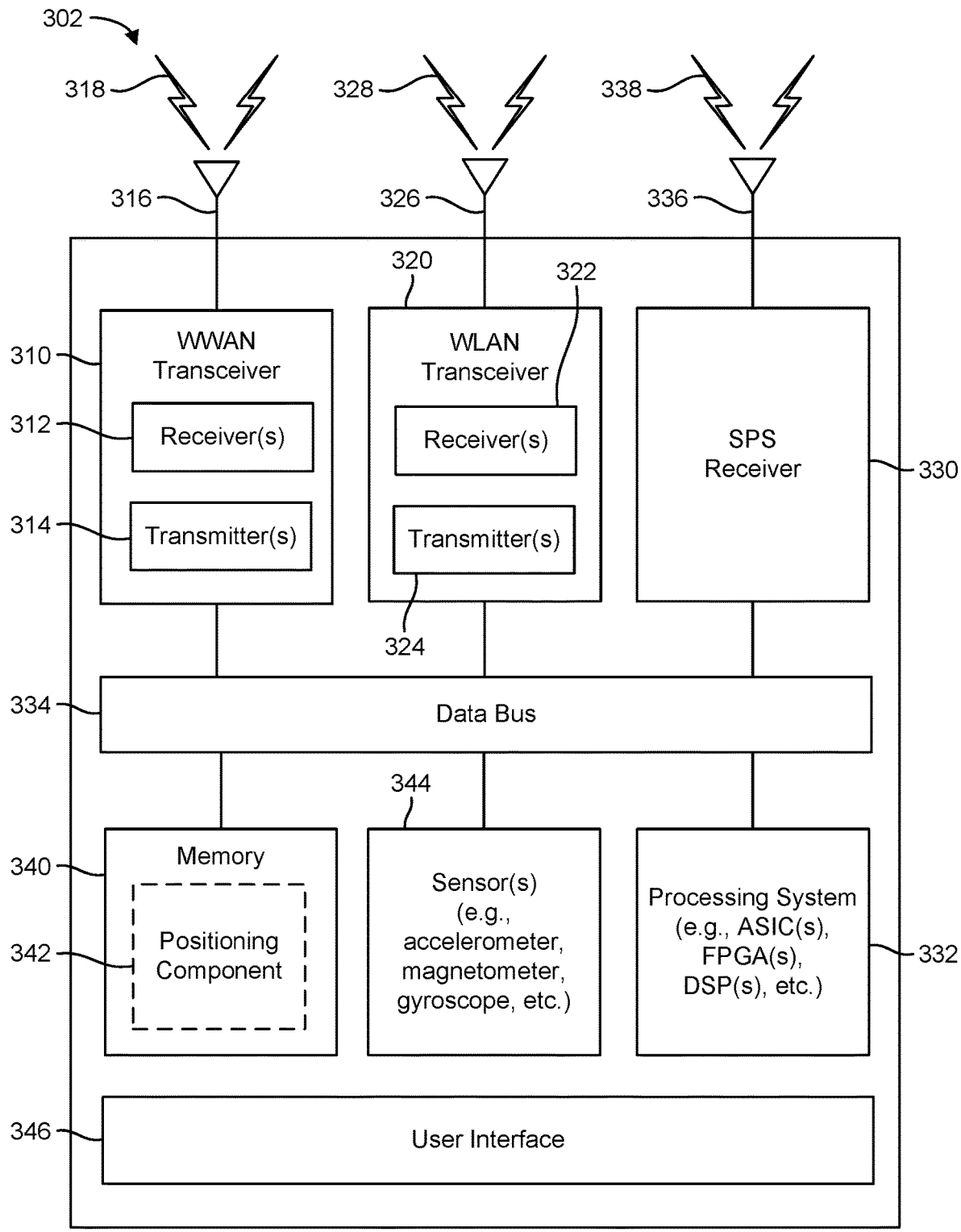
FIGS. 3A to 3C are simplified block diagrams of several sample aspects of components that may be employed in wireless communication nodes and configured to support communication as taught herein.
Figure 3B:
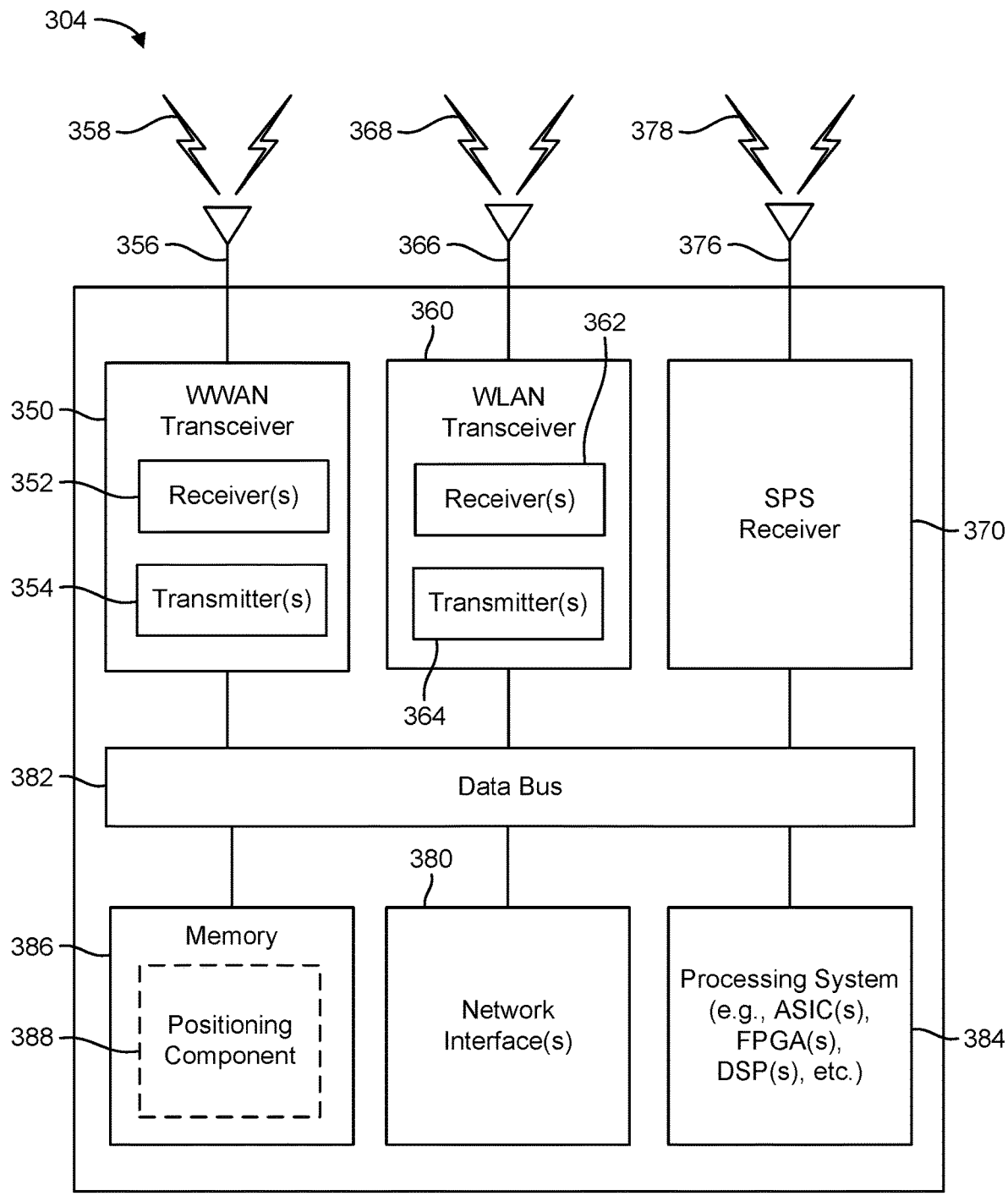
Figure 3C:
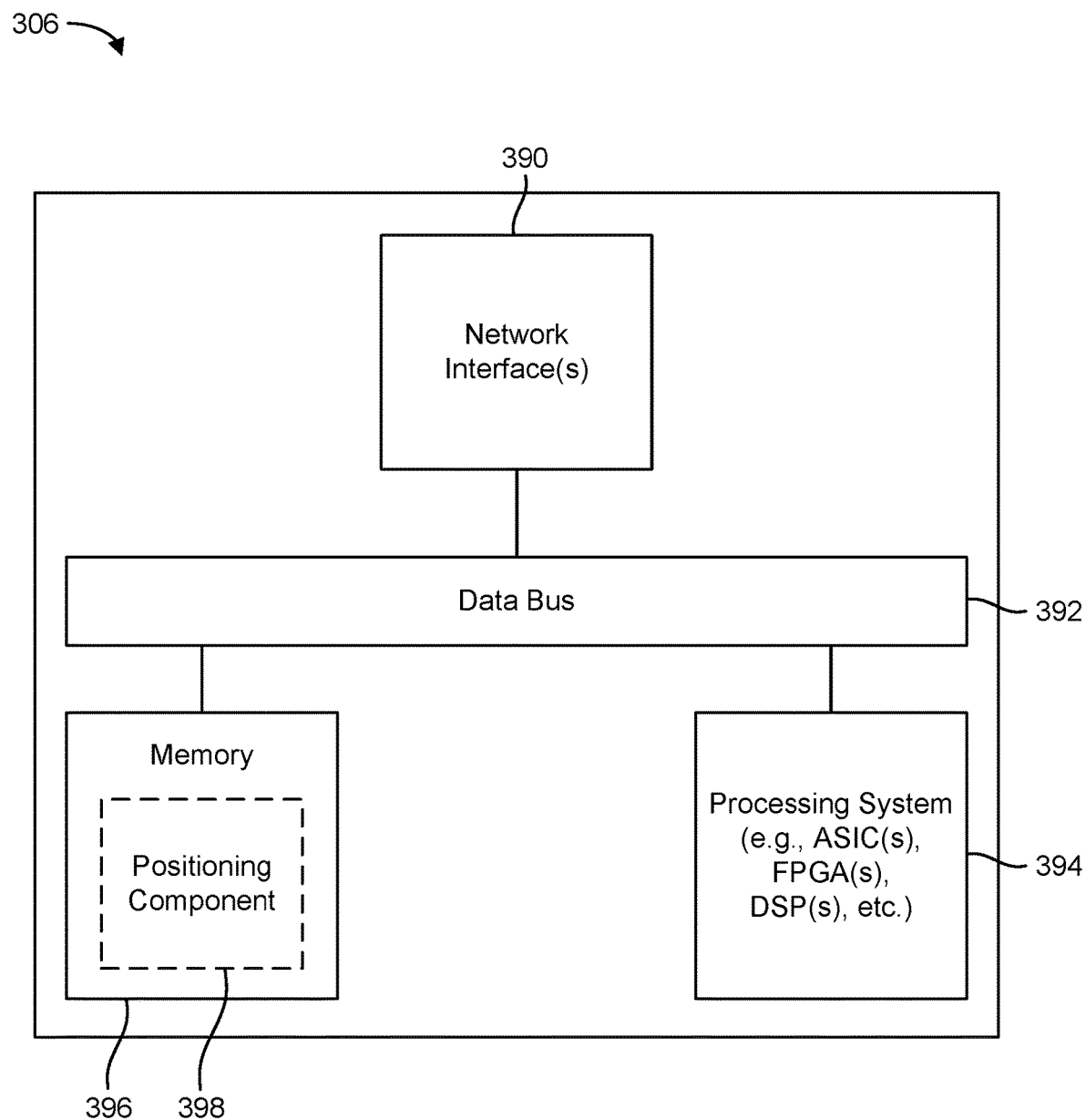

FIGS. 3A, 3B, and 3C illustrate several exemplary components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceivers 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370, respectively. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interface 380 and 390, respectively, for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, path loss estimation, and for providing other processing functionality. The base station 304 includes a processing system 384 for providing functionality relating to, for example, path loss estimation as disclosed herein, and for providing other processing functionality. The network entity 306 includes a processing system 394 for providing functionality relating to, for example, path loss estimation as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include positioning components 342, 388, and 398, respectively. The positioning components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the positioning components 342, 388, and 398 may be external to the processing systems 332, 384, and 394 (e.g., part of a modem processing system, integrated with another processing system, etc.). Alternatively, the positioning components 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the UL, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the positioning components 342, 388, and 398, etc.

Figure 4A:
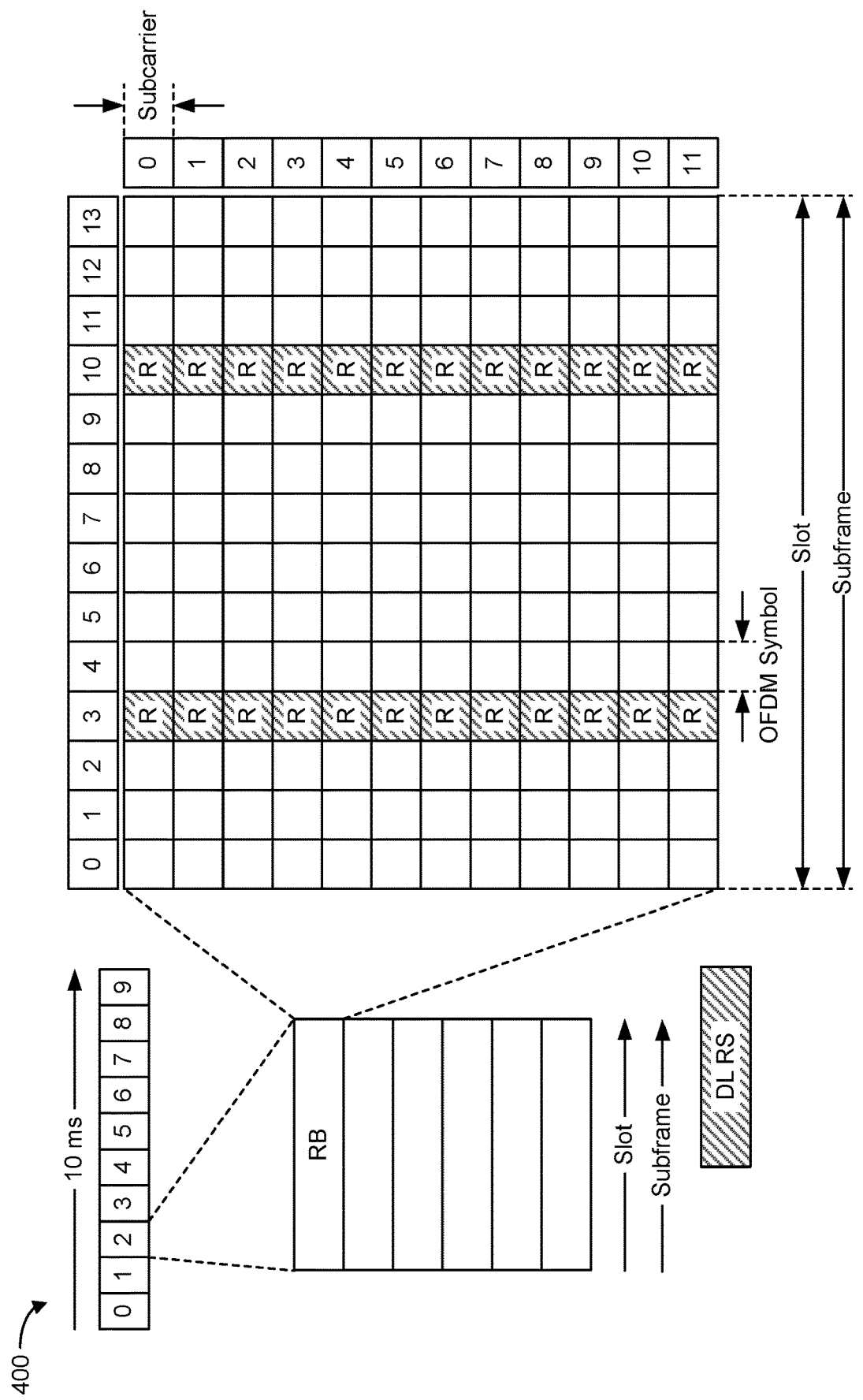
FIGS. 4A to 4D are diagrams illustrating example frame structures and channels within the frame structures, according to aspects of the disclosure.
Figure 4B:
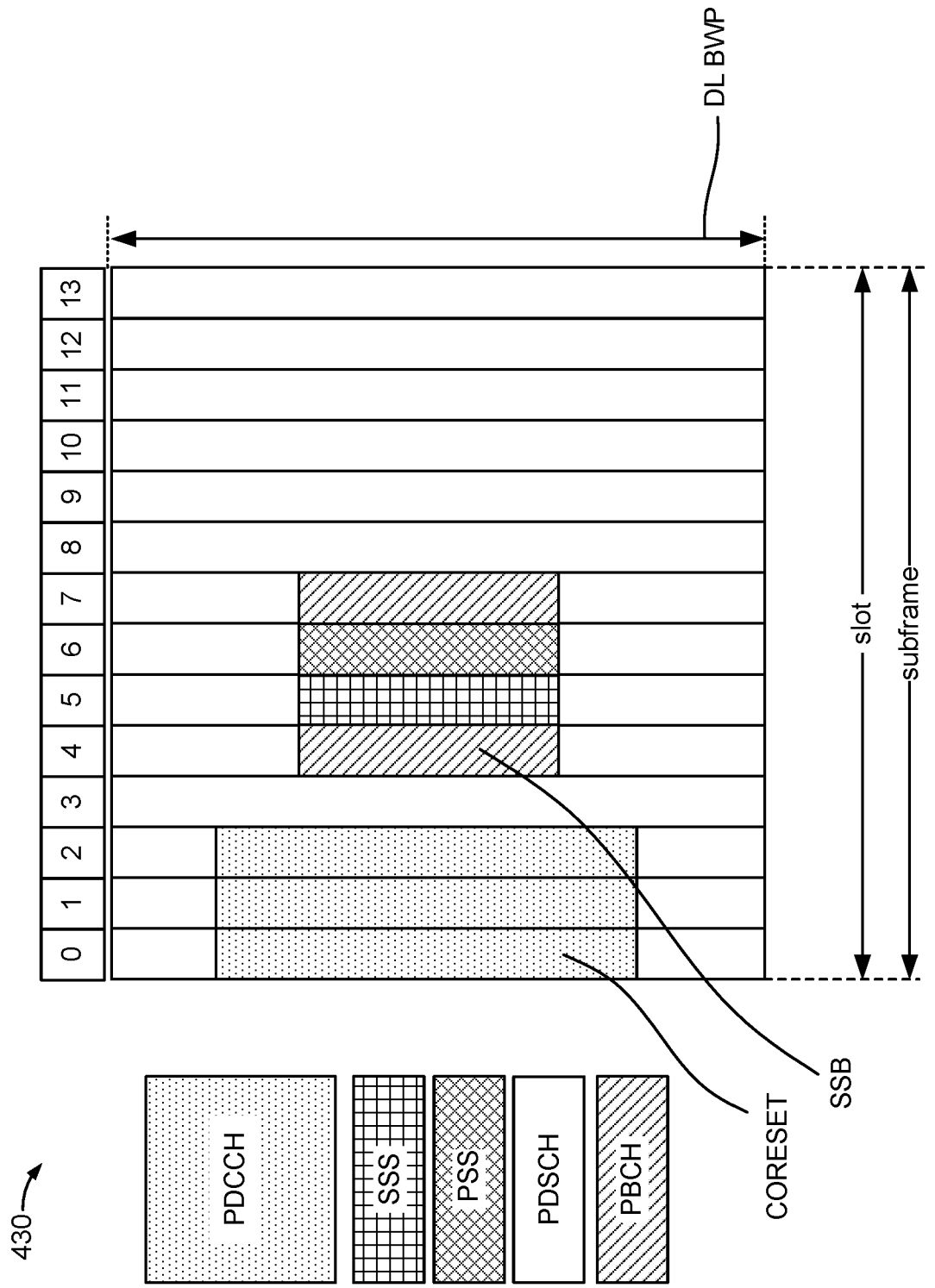
Figure 4C:
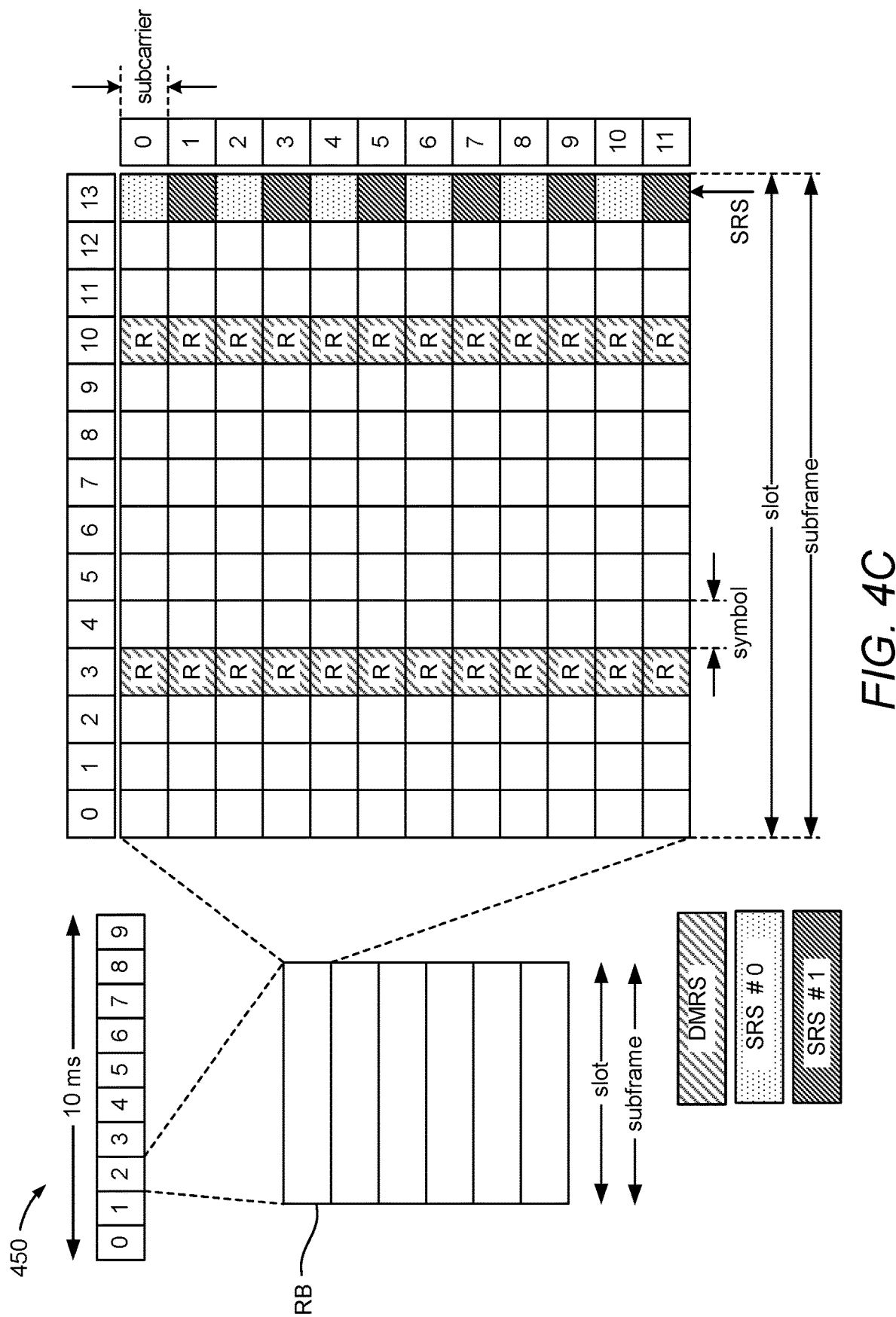
Figure 4D:
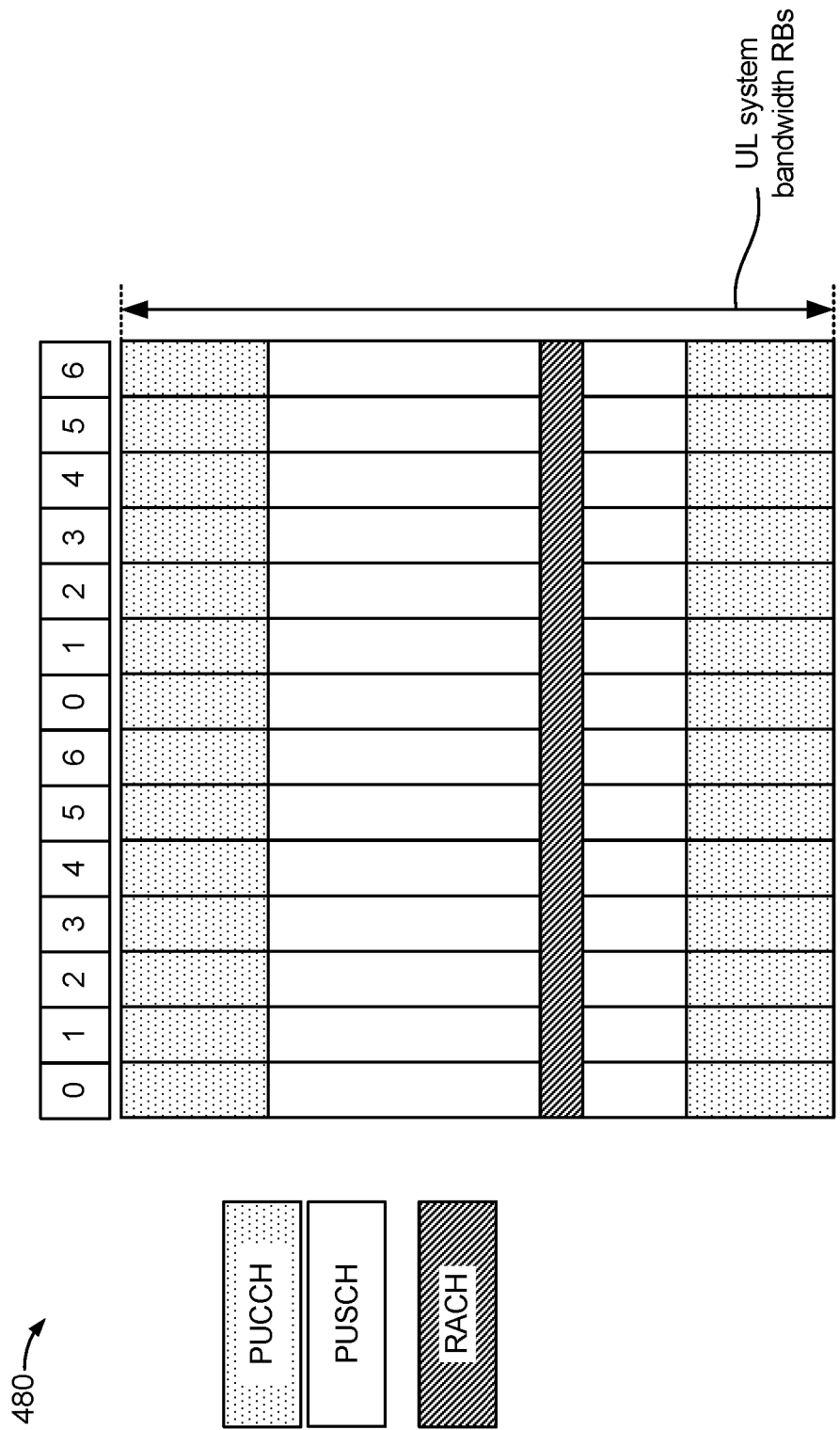

Various frame structures may be used to support downlink and uplink transmissions between network nodes (e.g., base stations and UEs). FIG. 4A is a diagram 400 illustrating an example of a downlink frame structure, according to aspects of the disclosure. FIG. 4B is a diagram 430 illustrating an example of channels within the downlink frame structure, according to aspects of the disclosure. FIG. 4C is a diagram 450 illustrating an example of an uplink frame structure, according to aspects of the disclosure. FIG. 4D is a diagram 480 illustrating an example of channels within an uplink frame structure, according to aspects of the disclosure. Other wireless communications technologies may have a different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands.

For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies ($\mu$), for example, subcarrier spacing of 15 kHz, 30 kHz, 60 kHz, 120 kHz and 240 kHz or greater may be available. Table 1 provided below lists some various parameters for different NR numerologies.

TABLE 1

| $\mu$ | SCS (kHz) | Symbols/ Sot | Slots/ Subframe | Slots/ Frame | Slot Duration (ms) | Symbol Duration ($\mu$s) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In the example of FIGS. 4A and 4B, a numerology of 15 kHz is used. Thus, in the time domain, a frame (e.g., 10 ms) is divided into 10 equally sized subframes of 1 ms each, and each subframe includes one time slot. In FIGS. 4A and 4B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A and 4B, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

As illustrated in FIG. 4A, some of the REs carry downlink reference (pilot) signals (DL-RS) for channel estimation at the UE. The DL-RS may include demodulation reference signals (DMRS), channel state information reference signals (CSI-RS), cell-specific reference signals (CRS), positioning reference signals (PRS), navigation reference signals (NRS), tracking reference signals (TRS), etc., exemplary locations of which are labeled "R" in FIG. 4A.

A collection of resource elements (REs) that are used for transmission of PRS is referred to as a "PRS resource." The collection of resource elements can span multiple PRBs in the frequency domain and N (e.g., 1 or more) consecutive symbol(s) within a slot in the time domain. In a given OFDM symbol in the time domain, a PRS resource occupies consecutive PRBs in the frequency domain.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a cell ID). In addition, the PRS resources in a PRS resource set have the same periodicity, a common muting pattern configuration, and the same repetition factor across slots. The periodicity may have a length selected from $2^m \cdot \{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," or simply an "occasion" or "instance."

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS signals in LTE, NRS in 5G, TRS, CRS, CSI-RS, DMRS, PSS, SSS, SSB, etc.

FIG. 4B illustrates an example of various channels within a downlink slot of a radio frame. In NR, the channel bandwidth, or system bandwidth, is divided into multiple bandwidth parts (BWPs). A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE. Multiple (e.g., up to eight) DCIs can be configured in the PDCCH, and these DCIs can have one of multiple formats. For example, there are different DCI formats for uplink scheduling, for non-MIMO downlink scheduling, for MIMO downlink scheduling, and for uplink power control. A PDCCH may be transported by 1, 2, 4, 8, or 16 CCEs in order to accommodate different DCI payload sizes or coding rates.

As illustrated in FIG. 4C, some of the REs carry DMRS for channel estimation at the base station. The UE may additionally transmit SRS in, for example, the last symbol of a subframe. The SRS may have a comb structure, and a UE may transmit SRS on one of the combs. The comb structure (also referred to as the "comb size") indicates the number of subcarriers in each symbol period carrying a reference signal (here, SRS). For example, a comb size of comb-4 means that every fourth subcarrier of a given symbol carries the reference signal, whereas a comb size of comb-2 means that every second subcarrier of a given symbol carries the reference signal. In the example of FIG. 4C, the illustrated SRS are both comb-2. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

FIG. 4D illustrates an example of various channels within an uplink subframe of a frame, according to aspects of the disclosure. A random access channel (RACH), also referred to as a physical random access channel (PRACH), may be within one or more subframes within a frame based on the PRACH configuration. The PRACH may include six consecutive RB pairs within a subframe. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

A collection of resource elements that are used for transmission of SRS is referred to as an "SRS resource," and may be identified by the parameter SRS-ResourceId. The collection of resource elements can span multiple PRBs in the frequency domain and N (e.g., one or more) consecutive symbol(s) within a slot in the time domain. In a given OFDM symbol, an SRS resource occupies consecutive PRBs. An "SRS resource set" is a set of SRS resources used for the transmission of SRS signals, and is identified by an SRS resource set ID (SRS-ResourceSetId).

Generally, a UE transmits SRS to enable the receiving base station (either the serving base station or a neighboring base station) to measure the channel quality between the UE and the base station. However, SRS can also be used as uplink positioning reference signals for uplink positioning procedures, such as uplink time-difference of arrival (UL-TDOA), multi-round-trip-time (multi-RTT), angle-of-arrival (AoA), etc.

Several enhancements over the previous definition of SRS have been proposed for SRS-for-positioning, such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters SpatialRelationInfo and PathLossReference are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There may also be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or DCI).

There are a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, NRS, CSI-RS, SSB, etc.) received from pairs of base stations, referred to as reference signal time difference (RSTD) or time difference of arrival (TDOA) measurements, and reports them to a positioning entity. More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include UL-TDOA and uplink angle-of-arrival (UL-AoA). UL-TDOA is similar to OTDOA and DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-RTT positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

To assist positioning operations, a location server (e.g., location server 230, LMF 270) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal ID, reference signal bandwidth, etc.), and/or other parameters applicable to the particular positioning method. Alternatively, the assistance data may originate directly from the base stations themselves (e.g., in periodically broadcasted overhead messages, etc.). in some cases, the UE may be able to detect neighbor network nodes itself without the use of assistance data.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 5:
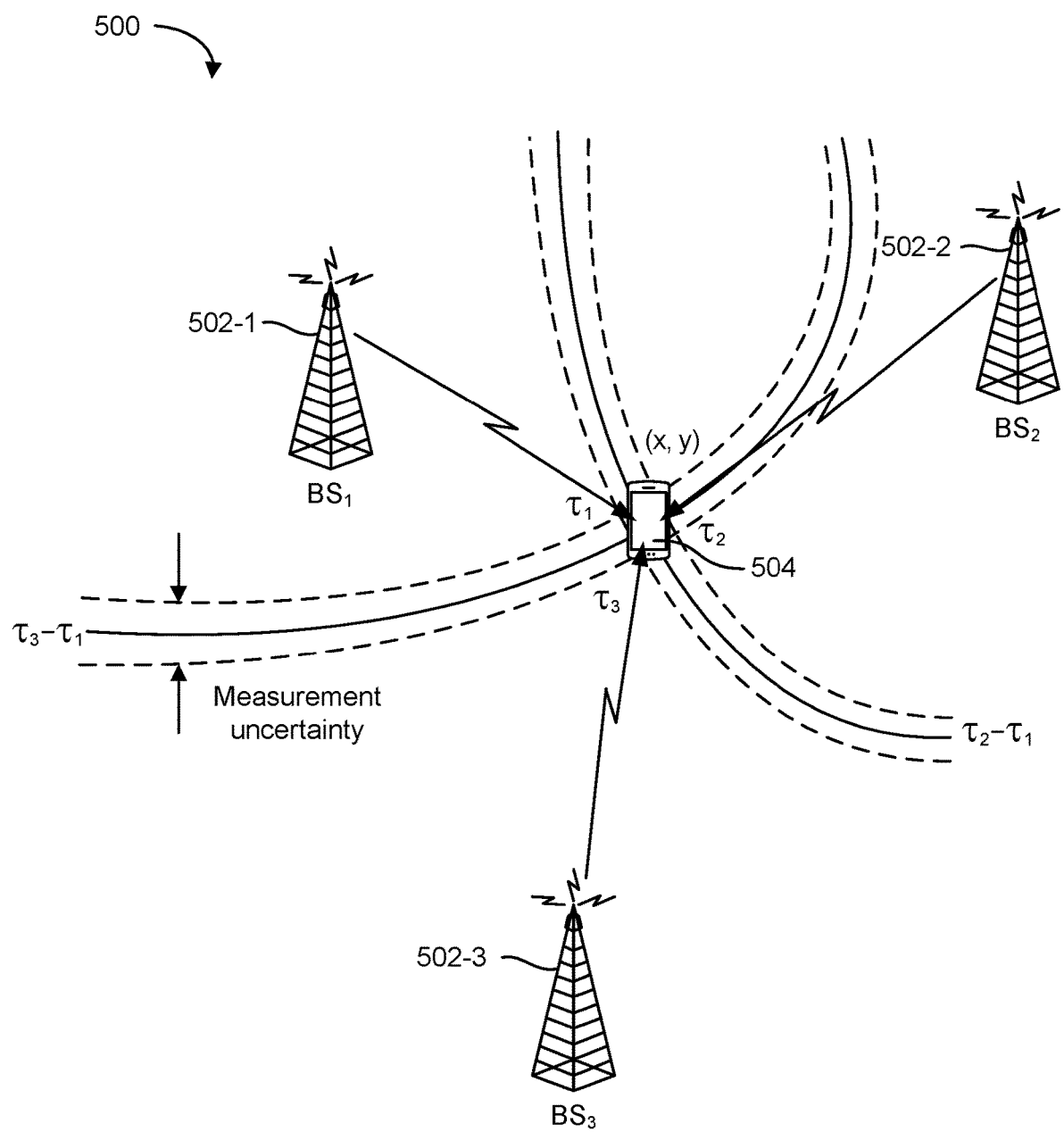
FIG. 5 is a diagram illustrating an exemplary technique for determining a position of a mobile device using information obtained from a plurality of base stations.

FIG. 5 illustrates an exemplary wireless communications system 500 in which a UE 504 (which may correspond to any of the UEs described herein) is attempting to calculate, or assist another entity (e.g., a serving base station or core network component, another UE, a location server, a third party application, etc.) to calculate, an estimate of its location, according to aspects of the disclosure. The UE 504 may communicate wirelessly with a plurality of cells/TRPs supported by a corresponding plurality of base stations 502-1, 502-2, and 502-3 (collectively, base stations 502), which may correspond to cells/TRPs of any combination of the base stations described herein. In an aspect, the location of the UE 504 may be specified using a two-dimensional (2D) coordinate system, or a three-dimensional (3D) coordinate system if the extra dimension is desired. Additionally, while FIG. 5 illustrates one UE 504 and three base stations 502, as will be appreciated, there may be more UEs 504 and more or fewer base stations 502.

To support location estimates, the cells/TRPs of base stations 502 may be configured to broadcast positioning reference signals (e.g., PRS, NRS, TRS, CRS, etc.) to UEs 504 in their coverage area to enable a UE 504 to measure characteristics of such reference signals. For example, as briefly described above, the OTDOA positioning method in LTE is a multilateration method in which the UE 504 measures the time difference, known as the RSTD, between specific reference signals (e.g., LTE PRS) transmitted by the cells/TRPs of different pairs of base stations 502 and either reports these time differences to a location server (e.g., location server 230 or LMF 270), referred to as UE-assisted positioning, or computes a location estimate itself from these time differences, referred to as UE-based positioning. DL-TDOA is a similar positioning method in NR, but uses NR positioning reference signals, such as NR PRS, NRS, TRS, CRS, CSI-RS, DMRS, SSB, PSS, SSS, etc.

Generally, RSTDs are measured between a cell/TRP of a reference base station (e.g., base station 502-1 in the example of FIG. 5), referred to as a reference cell/TRP and one or more cells/TRPs of neighbor base stations (e.g., base stations 502-2 and 502-3 in the example of FIG. 5), referred to as neighbor cells/TRPs. The reference cell/TRP remains the same for all RSTDs measured by the UE 504 for any single positioning use of OTDOA/DL-TDOA, and would typically correspond to the serving cell/TRP for the UE 504 or the cell/TRP of another nearby base station with good signal strength at the UE 504. Note that a UE (e.g., UE 504) normally measures RSTDs of reference signals transmitted by the cells/TRPs of different base stations 502, rather than different cells/TRPs of the same base station 502.

To assist positioning operations, a location server (e.g., location server 230, LMF 270) may provide OTDOA/DL-TDOA assistance data to the UE 504 for the cell/TRP of the reference base station (base station 502-1 in the example of FIG. 5) and the cells/TRPs of the neighbor base stations (base stations 502-2 and 502-3 in the example of FIG. 5) relative to the reference cell/TRP. For example, the assistance data may provide the center channel frequency of each cell/TRP, various reference signal configuration parameters (e.g., the number of consecutive positioning subframes, periodicity of positioning subframes, muting sequence, frequency hopping sequence, reference signal identifier (ID), reference signal bandwidth, etc.), a cell/TRP global ID, and/or other cell/TRP related parameters applicable to OTDOA/DL-TDOA. The assistance data may indicate the serving cell/TRP for the UE 504 as the reference cell/TRP.

In some cases, the assistance data may also include "expected RSTD" parameters, which provide the UE 504 with information about the RSTD values the UE 504 is expected to measure at its current location between the cell/TRP of the reference base station 502-1 and the cell/TRP of each neighbor base station 502-2 and 502-3, together with an uncertainty of the expected RSTD parameter. The expected RSTD, together with the associated uncertainty, may define a search window for the UE 504 within which the UE 504 is expected to measure the RSTD value for a pair of cells/TRPs. OTDOA/DL-TDOA assistance data may also include reference signal configuration parameters, which allow the UE 504 to determine when a reference signal positioning occasion occurs on signals received from the various neighbor cells/TRPs relative to reference signal positioning occasions for the reference cell/TRP, and to determine the reference signal sequence transmitted from various cells/TRPs in order to measure a signal time of arrival (ToA) or RSTD.

In an aspect, while the location server (e.g., location server 230, LMF 270) may send the assistance data to the UE 504, alternatively, the assistance data can originate directly from the cells/TRPs of the base stations 502 themselves (e.g., in periodically broadcasted overhead messages). Alternatively, the UE 504 can detect neighbor cells/TRPs itself without the use of assistance data.

The UE 504 (e.g., based in part on the assistance data, if provided) can measure and (optionally) report the RSTDs between reference signals received from the cells/TRPs of pairs of different base stations. Using the RSTD measurements, the known absolute or relative transmission timing (e.g., whether the involved base stations 502 are accurately synchronized or whether each base station 502 transmits with some known time difference relative to other base stations 502) of each cell/TRP, and the known physical locations of the transmitting antennas for the reference and neighboring base stations, the network (e.g., location server 230/LMF 270, the serving base station 502) or the UE 504 may estimate a location of the UE 504. More particularly, the RSTD for a neighbor cell/TRP "k" relative to a reference cell/TRP "Ref" may be given as (ToA$_k$-ToA$_{Ref}$), where the ToA values may be measured modulo one slot duration (e.g., 1 ms) to remove the effects of measuring different slots at different times. In the example of FIG. 5, the measured time differences between the reference cell/TRP of base station 502-1 and the cells/TRPs of neighboring base stations 502-2 and 502-3 are represented as $\tau_2$-$\tau_1$ and $\tau_3$-$\tau_1$, where $\tau_1$, $T_2$, and $T_3$ represent the ToA of a reference signal from the cells/TRPs of base stations 502-1, 502-2, and 502-3, respectively. The UE 504 may then convert the ToA measurements for different cells/TRPs to RSTD measurements and (optionally) send them to the location server 230/LMF 270. Using (i) the RSTD measurements, (ii) the known absolute or relative transmission timing of each cell/TRP, (iii) the known physical locations of the transmitting antennas for the reference and neighboring base stations, and/or (iv) directional reference signal characteristics, such as a direction of transmission, the UE's 504 location may be estimated (either by the UE 504 or the location server 230/LMF 270).

Still referring to FIG. 5, when the UE 504 obtains a location estimate using the OTDOA/DL-TDOA positioning method, the necessary additional data (e.g., the base stations' 502 locations and relative transmission timing) may be provided to the UE 504 by a location server (e.g., location server 230, LMF 270). In some implementations, a location estimate for the UE 504 may be obtained (e.g., by the UE 504 itself or by the location server 230/LMF 270) from RSTDs and from other measurements made by the UE 504 (e.g., measurements of signal timing from GPS or other global navigation satellite system (GNSS) satellites). In these implementations, known as hybrid positioning, the RSTDs may contribute towards obtaining the UE's 504 location estimate but may not wholly determine the location estimate.

UL-TDOA is a similar positioning method to OTDOA and DL-OTDOA, but is based on uplink reference signals (e.g., SRS, uplink PRS) transmitted by the UE (e.g., UE 504). Further, transmission and/or reception beamforming at the base stations 502 and/or the UE 504 can enable wideband bandwidth at the cell edge for increased precision. Beam refinements may also leverage channel reciprocity procedures in NR.

OTDOA and DL-OTDOA positioning methods need precise timing synchronization across the involved base stations. That is, the start of each downlink radio frame must begin at precisely the same time, or have some known offset from a reference time. In NR, however, there may not be a requirement for precise timing synchronization across base stations. Instead, it may be sufficient to have coarse time-synchronization across base stations (e.g., within a cyclic prefix (CP) duration of the OFDM symbols). RTT-based methods generally only need coarse timing synchronization, and as such, are a common positioning method in NR.

Multi-RTT was introduced above. In greater detail, in a network-centric multi-RTT location estimation, the serving base station instructs the UE to, or notifies the UE that it may, scan for/receive RTT measurement signals from the cells/TRPs of two or more neighboring base stations (and typically the serving base station, as at least three base stations are needed). The involved cells/TRPs transmit RTT measurement signals via low reuse resources (e.g., time-frequency resources used by the cell/TRP to transmit system information) allocated by the network (e.g., location server 230, LMF 270). The UE records the ToA of each RTT measurement signal relative to the UE's current downlink timing (as derived by the UE from a downlink reference signal received from its serving cell/TRP), and transmits a common or individual RTT response message to the involved cells/TRPs (e.g., when instructed by its serving cell/TRP). The RTT response message(s) may include the differences between the ToAs of the RTT measurement signals and the transmission time(s) of the RTT response message(s), referred to as the UE Rx-Tx measurement, or $T_{Rx \rightarrow Tx}$ (e.g., $T_{Rx-Tx}$ 612 in FIG. 6). The RTT response message includes an uplink reference signal (e.g., SRS, DMRS, UL-PRS) that the involved cells/TRPs can use to deduce the ToA of the RTT response message. By comparing the difference between the transmission time of the RTT measurement signal and the ToA of the RTT response message, referred to as the BS Tx-Rx measurement, or $T_{Tx \rightarrow Rx}$ (e.g., $T_{Tx \rightarrow Rx}$ 22 in FIG. 6), to the UE Rx-Tx measurement, the positioning entity (e.g., location server 230, LMF 270, the serving base station, the UE) can determine the propagation time, or time of flight, between each base station and the UE. From the propagation time, the positioning entity can calculate the distance between the UE and each base station by assuming the speed of light during this propagation time.

A UE-centric multi-RTT location estimation is similar to the network-based method, except that the UE transmits uplink RTT measurement signal(s) that are received by the cells/TRPs of multiple base stations within communication range of the UE (e.g., the serving cell/TRP and neighboring cells/TRPs). In an aspect, the serving cell/TRP may instruct the UE to transmit the uplink RTT measurement signal(s). Instructing the UE may include scheduling the uplink time-frequency resources on which the UE is to transmit the uplink RTT measurement signal(s). Alternatively, the serving cell/TRP may notify the UE that it may transmit the RTT measurement signal(s), and the notification may include an indication of the resources that can be used. Each involved cell/TRP responds to reception of the uplink RTT measurement signal(s) with a downlink RTT response message, which may include the ToA of the RTT measurement signal at the cell/TRP in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the arrival (or receive) time(s) of the first message(s) or signal(s) in the RTT response message(s) payload.

Figure 6:
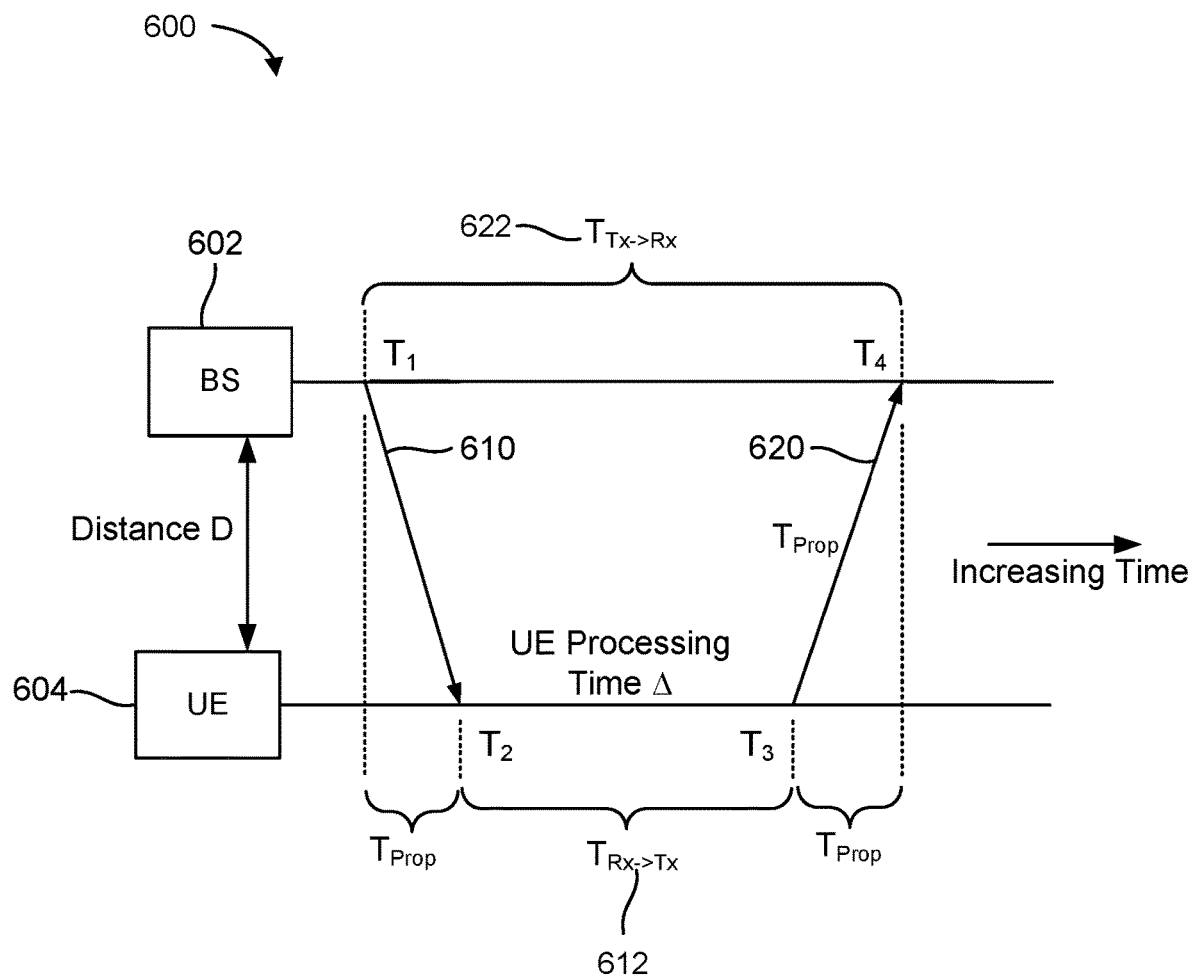
FIG. 6 is a diagram showing exemplary timings of round-trip-time (RTT) measurement signals exchanged between a base station and a UE, according to aspects of the disclosure.

FIG. 6 is a diagram 600 showing exemplary timings of RTT signals exchanged between a cell/TRP of a base station 602 (which may correspond to any of the base stations described herein) and a UE 604 (which may correspond to any of the UEs described herein), according to aspects of the disclosure. In the example of FIG. 6, the cell/TRP of the base station 602 sends an RTT measurement signal 610 (e.g., PRS, NRS, CRS, CSI-RS, SSB, etc.) to the UE 604 at time $T_1$. The RTT measurement signal 610 has some propagation delay $T_{Prop}$ as it travels from the cell/TRP of the base station 602 to the UE 604. At time $T_2$ (the ToA of the RTT measurement signal 610 at the UE 604), the UE 604 receives/measures the RTT measurement signal 610. After some UE processing time, the UE 604 transmits an RTT response signal 620 (e.g., SRS, DMRS, UL-PRS) at time $T_3$. After the propagation delay $T_{Prop}$, the cell/TRP of the base station 602 receives/measures the RTT response signal 620 from the UE 604 at time $T_4$ (the ToA of the RTT response signal 620 at the base station 602).

The RTT response signal 620 may explicitly include the difference between time $T_3$ and time $T_2$ (i.e., $T_{Rx \to Tx}$ 612). Alternatively, it may be derived from the timing advance (TA), that is, the relative uplink/downlink frame timing and specification location of uplink reference signals. (Note that the TA is usually the RTT between the base station and the UE, or double the propagation time in one direction.) Using this measurement and the difference between time $T_4$ and time $T_1$ (i.e., $T_{Tx \to Rx}$ 622), the positioning entity can calculate the distance to the UE 604 as:

$$d = \tfrac{1}{2} \cdot c \cdot (T_{Tx \to Rx} - T_{Rx \to Tx}) = \tfrac{1}{2} \cdot c \cdot (T_4 - T_1) - \tfrac{1}{2} \cdot c \cdot (T_3 - T_2)$$

where c is the speed of light.

In order to identify the ToA of a reference signal transmitted by a given network node (e.g., a base station), the receiver (e.g., a UE) first jointly processes all the resource elements (also referred to as "tones" or "subcarriers") on the channel on which that network node is transmitting the reference signal, and performs an inverse Fourier transform to convert the received RF signals to the time domain. The conversion of the received RF signals to the time domain is referred to as estimation of the channel energy response (CER). The CER shows the peaks on the channel over time, and the earliest "significant" peak should therefore correspond to the ToA of the reference signal. Generally, the receiver will use a noise-related quality threshold to filter out spurious local peaks, thereby presumably correctly identifying significant peaks on the channel. For example, the receiver may chose a ToA estimate that is the earliest local maximum of the CER that is at least X dB higher than the median of the CER and a maximum Y dB lower than the main peak on the channel. The receiver determines the CER for each reference signal from each network node in order to determine the ToA of each reference signal from the different network nodes.

When performing positioning procedures while operating in carrier aggregation (CA) mode, a UE may need to measure more downlink reference signals (e.g., RTT measurement signal 610) than just those transmitted in the PCell and/or SCell to which it is tuned or to which it can tune. These additional serving cells correspond to component carriers other than the PCell and the SCell(s) that the UE can detect/measure. Some of these non-PCell/SCell serving cells may be supported by the same base station(s) that supports the PCell and the SCell(s), and some may be supported by one or more other base stations, or they may all be supported by the same base station(s) that supports the PCell and the SCell(s), or they may all be supported by one or more other base stations.

During UL-TDOA and RTT positioning procedures, a UE transmits uplink reference signals, such as SRS and UL-PRS, that need to be transmitted with a high enough transmit power that they can be detected/measured by the base station(s) supporting these non-PCell/SCell serving cells. Because such base stations may be further away from the UE than the base station(s) supporting the PCell and SCell(s), there may be more path loss between the UE and the base station(s) supporting the non-PCell/SCell serving cells than between the UE and the base station(s) supporting the PCell and SCell(s). As such, these uplink reference signals may need to be transmitted with a higher transmit power than uplink signals transmitted to the base station(s) supporting the PCell and SCell(s).

Several options have been identified for setting the transmission power of uplink reference signals transmitted for positioning purposes (e.g., UL-TDOA, RTT). As a first option, the transmit power of such uplink reference signals may be constant (i.e., no power control is supported). As a second option, the transmit power of uplink reference signals may be based on the existing power control procedure. As a third option, the transmit power may be determined by modifying the existing power control procedure. For example, a downlink reference signal of a non-PCell/SCell serving cell can be configured to be used for the path loss estimation for an uplink reference signal. More specifically, the UE can estimate the path loss of the downlink reference signal and determine the appropriate transmit power for the uplink reference signal based on the determined path loss. In an aspect, the downlink reference signals may be a CSI-RS, an SSB, a downlink PRS, etc.

Referring to the third option, using a downlink reference signal from a neighboring cell to estimate the path loss of an uplink reference signal, various other features need to be supported in NR in addition to the existing legacy behaviour. For example, there needs to be support for configuring a downlink reference signal of a neighboring cell to be used as the path loss reference (i.e., a downlink reference signal the UE is configured to use to estimate the path loss between itself and the base station transmitting the downlink path loss reference) for the purposes of uplink reference signal transmit power control. However, there is no specification of the number of measurements the UE should perform to estimate the path loss.

In addition to using a downlink reference signal to determine the transmit power of an uplink reference signal, a UE can use a downlink reference signal from a non-PCell/SCell serving cell to determine the spatial direction of an uplink transmit beam (also referred to as spatial transmit QCL, spatial QCL, spatial transmit beam, uplink spatial transmit beam, and the like) carrying uplink reference signals (again in the case of a positioning procedure). The downlink reference signal to determine the transmit power of an uplink reference signal and the downlink reference signal to determine the spatial direction of an uplink transmit beam may be, but need not be, the same downlink reference signal.

For uplink beam management/alignment towards the serving and neighboring cells, various features (in addition to UE transmit beam sweeping) are currently supported. First, the configuration of a spatial relation between a downlink reference signal from the serving cell or neighboring cell(s) and the target uplink reference signal is supported. Currently, downlink reference signals that can be used include at least the SSB, and may include CSI-RS and downlink PRS. Second, a fixed transmit beam for uplink reference signal transmissions across multiple uplink reference signal resources, for both FR1 and FR2, is supported. Note that in contrast to previous behaviour, a UE is not expected to transmit multiple uplink reference signal resources with different spatial relations in the same OFDM symbol.

For positioning purposes, various options are supported to assist a UE to perform receive beamforming. As a first option, downlink positioning reference signals (e.g., PRS) can be configured to be Type D QCL with a downlink reference signal from a serving cell (e.g., PCell or SCell) or a neighboring cell. Such downlink reference signals may include, for example, SSB, CSI-RS, and downlink PRS. For example, a downlink PRS used for positioning could be Type D QCL with another downlink PRS from a serving cell or a neighboring cell. Thus, the UE could use a downlink PRS from a serving cell or a neighboring cell to determine the receive beam for a downlink PRS being used for a positioning procedure. As a second option, the UE may perform a receive beam sweep on downlink PRS resources that are transmitted with the same downlink spatial domain transmission filter. As a third option, the UE may use a fixed receive beam to receive downlink PRS resources that are transmitted with a different downlink spatial domain transmission filter.

As noted above, the UE can calculate the transmit power for an uplink reference signal based on the path loss of a downlink reference signal. The UE can do so as follows. If a UE transmits uplink reference signals (e.g., SRS) on uplink BWP b of carrier f of serving cell c using an SRS power control adjustment state with index l, then, as defined in Third Generation Partnership Project (3GPP) Technical Specification (TS) 38.213 (which is publicly available and incorporated herein by reference in its entirety), the UE can determine the SRS transmission power $P_{SRS,b,f,c}(i,q_s,l)$ in SRS transmission occasion i as (in dBm):

$$P_{SRS,b,f,c}(i, q_s, l) = \min\left\{\begin{array}{l} P_{CMAX,f,c}(i), \\ P_{O\_SRS,b,f,c}(q_s) + 10\log_{10}(2^\mu \times M_{SRS,b,f,c}(i)) + \\ \alpha_{SRS,b,f,c}(q_s) \times PL_{b,f,c}(q_d) + h_{b,f,c}(i, l) \end{array}\right\}$$

where:

$P_{CMAX,f,c}(i)$ is the configured UE transmit power for carrier f of serving cell c in SRS transmission occasion i;

$P_{O\_SRS,b,f,c}(q_s)$ is provided by higher layer parameter p0 for uplink BWP b of carrier f of serving cell c and SRS resource set q provided by higher layer parameters SRS-ResourceSet and SRS-ResourceSetId. If p0 is not provided, $P_{O\_SRS,b,f,c}(q_s) = P_{O\_NOMINALPUSCH,f,c}(0)$;

$M_{SRS,b,f,c}(i)$ is the SRS bandwidth expressed in number of resource blocks for SRS transmission occasion i on active uplink BWP b of carrier f of serving cell c and μ is a subcarrier spacing (SCS) configuration;

$\alpha_{SRS,b,f,c}(q_s)$ is provided by higher layer parameter alpha for uplink BWP b of carrier f of serving cell c and SRS resource set $q_s$;

$PL_{b,f,c}(q_d)$ is a downlink path loss estimate in dB calculated by the UE using reference signal index $q_d$ for a downlink BWP that is linked with uplink BWP b of carrier f of serving cell c and SRS resource set $q_d$. The reference signal index $q_d$ is provided by higher layer parameter pathlossReferenceRS associated with the SRS resource set $q_s$ and is either a higher layer parameter ssb-Index providing a synchronization signal (SS)/physical broadcast channel (PBCH) block index or a higher layer parameter csi-RS-Index providing a CSI-RS resource index. If the UE is not provided the higher layer parameter pathlossReferenceRS or before the UE is provided dedicated higher layer parameters, the UE calculates $PL_{b,f,c}(q_d)$ using a reference signal resource obtained from the SS/PBCH block index that the UE uses to obtain the master information block (MIB). If the UE is provided pathlossReferenceLinking, the reference signal resource is on a serving cell indicated by a value of pathlossReferenceLinking;

$h_{b,f,c}(i,l) = f_{b,f,c}(i,l)$, where $f_{b,f,c}(i,l)$ is the current physical uplink shared channel (PUSCH) power control adjustment state, if the higher layer parameter srs-PowerControlAdjustmentStates indicates the same power control adjustment state for SRS transmissions and PUSCH transmissions.

Currently, the UE may calculate up to four path loss estimates per serving cell (a PCell or SCell). These can be distributed in any way over the four BWPs, such as one path loss estimate per BWP, all four path loss estimates for one BWP, etc. A UE does not expect to simultaneously maintain more than four path loss estimates per serving cell for all PUSCH/PUCCH/SRS transmissions. That is, the UE does not expect to use more than four downlink reference signals per serving cell for all PUSCH/PUCCH/SRS transmissions. This may also be referred to as "maintaining" downlink reference signals, which includes the ability of the UE to receive the downlink reference signals, process them, extract information from this processing, store this information in memory, and use it to derive the spatial transmit beam(s), uplink transmit power(s), and/or spatial receive beam(s).

As noted above, a serving cell (PCell or SCell) corresponds to a component carrier supported by a base station. It is possible that the UE could receive the path loss reference on one component carrier, and use the derived path loss estimate for an uplink reference signal (e.g., SRS) on a different component carrier. The pathlossReferenceLinking parameter indicates whether the UE should apply, as a path loss reference, a downlink reference signal received on either the PCell or the SCell for this uplink reference signal.

For SRS (and other uplink reference signals) transmitted for positioning, the UE may be configured with multiple SRS resources, each with a different downlink reference signal for path loss estimation or spatial transmit beam determination for different non-PCell/SCell serving cells. Similarly, on the downlink, several PRS (and other downlink positioning reference signals) resources may be configured, each one with a different downlink reference signal for spatial receive beam determination. In an aspect, resources for downlink PRS and/or uplink SRS, for example, could span across multiple component carriers. However, simultaneously using multiple downlink reference signals for uplink spatial transmit beam and/or uplink spatial receive beam determination, and/or path loss estimation, increases the complexity of the UE.

Accordingly, the present disclosure provides techniques for setting the maximum number of downlink reference signals that can be used for path loss estimation, uplink spatial transmit beam determination, and/or spatial receive beam determination. More specifically, the present disclosure specifies the maximum number of distinct downlink reference signals to be used simultaneously for (1) path loss estimation for uplink reference signals for positioning (e.g., uplink PRS or SRS), (2) uplink spatial transmit beam determination for uplink reference signals for positioning (e.g., uplink PRS or SRS), and (3) spatial receive beam determination for downlink positioning reference signals (e.g., PRS, CSI-RS, etc.). "Distinct" downlink reference signals means that the UE receives dedicated configuration signaling for each downlink reference signal (e.g., periodicity, slot offset, transmission point, sequence, port number, etc.).

There are a number of options for determining the maximum number of downlink reference signals that can be used simultaneously by the UE. As a first option, the maximum could be the maximum number of downlink reference signals associated with each base station (serving or neighboring) for the downlink positioning reference signals (e.g., PRS) configured within a serving cell (e.g., PCell or SCell) of that base station. That is, within each serving cell, the maximum may be the maximum number of distinct downlink reference signals that can be simultaneously used by the UE for each neighboring base station from which the UE is measuring downlink positioning reference signals on that serving cell. Thus, a maximum value of "2" would permit the UE to use up to a maximum of two downlink reference signals for each base station operating in a given serving cell. (A UE can identify with which base station a serving cell is associated by decoding the SSB carried on the cell.) As an example, the UE may be configured with resources within a serving cell for transmitting uplink reference signals (e.g., SRS) for positioning, but each resource may be intended to be received from a different base station. In that case, there can be up to two distinct downlink reference signals received for any neighboring base station for the SRS resources of each cell. More specifically, one downlink reference signal could be used for positioning acquisition and the second could be used for positioning tracking after acquisition has been completed.

As a second option, the maximum could be the maximum number of distinct downlink reference signals associated with each neighboring base station for all of the downlink positioning reference signals (e.g., PRS) across all serving cells that the UE is capable of receiving (e.g., due to UE capability). That is, the maximum may be the maximum number of distinct downlink reference signals that can be simultaneously used by the UE across all serving cells receivable by the UE for each neighboring base station. Thus, a maximum value of "8" would permit the UE to use up to eight downlink reference signals across all of the serving cells supported by a given base station that the UE is capable of receiving. As an example, if the UE is configured with SRS resources for positioning within multiple serving cells, but each SRS resource for positioning purposes is intended to be received from a different cell, then there can be up to four distinct downlink reference signals received for any neighboring base station across all the SRS resources of all the serving cells. More specifically, the UE needs to receive a downlink reference signal from at least four different base stations, each downlink reference signal associated with a different SRS resource (so that there are four RTT numbers), to perform a 3D position estimate. However, if the UE is only performing a 2D position estimate, a total of three downlink reference signals and three associated SRS resources could be enough.

As a third option, the maximum could be a combination of the first and second options described above. Specifically, there may be two constraints on the maximum number of distinct downlink reference signals that can be simultaneously used by the UE, a per-cell constraint (first option) and an across-cells constraint (second option). Currently, the maximum of four path loss references/estimates is per cell or across all cells, without an association with a base station. In addition, the four path loss references/estimates are for all uplink transmissions (e.g., PUSCH, PUCCH, SRS, uplink PRS), not just uplink positioning transmissions (e.g., SRS, uplink PRS).

As a fourth option, the maximum could be the maximum number of downlink reference signals across all associated neighboring base stations for the downlink positioning reference signals (e.g., PRS) configured within a serving cell (e.g., PCell or SCell). That is, within each serving cell, the maximum may be the maximum number of distinct downlink reference signals that can be simultaneously used by the UE for all neighboring base stations from which the UE is measuring downlink positioning reference signals on that serving cell. As an example, if the UE is configured with SRS resources for positioning within a serving cell, but each SRS resource for positioning purposes is intended to be received from a different base station, then there can be up to two distinct downlink reference signals received across all neighboring base stations for the SRS resources of each cell. More specifically, one of the two each downlink reference signals could be used for positioning acquisition and the second could be used for positioning tracking after acquisition has been completed.

As a fifth option, the maximum could be the maximum number of downlink reference signals across all associated neighboring base stations for all of the downlink positioning reference signals across all serving cells (e.g., the PCell and all SCells). That is, the maximum may be the maximum number of distinct downlink reference signals that can be simultaneously used by the UE across all serving cells for all neighboring base station from which the UE is measuring downlink positioning reference signals. As an example, if the UE is configured with SRS resources for positioning within multiple serving cells, but each SRS resource for positioning purposes is intended to be received from a different cell, then there can be up to four distinct downlink reference signals received across all neighboring base stations across all the SRS resources of all serving cells. More specifically, the UE needs to receive a downlink reference signal from at least four different base stations, each downlink reference signal associated with a different SRS resource (so that there are four RTT numbers), to perform a 3D position estimate. However, if the UE is only performing a 2D position estimate, a total of three downlink reference signals and three associated SRS resources may be enough.

As a sixth option, the maximum could be a combination of the fourth and fifth options described above. Specifically, there may be two constraints on the maximum number of distinct downlink reference signals that can be simultaneously used by the UE, a per-cell constraint (fourth option) and an across-cells constraint (fifth option).

As a seventh option, the maximum could be the maximum number of distinct downlink reference signals that can be simultaneously used by the UE across all downlink positioning reference signals (e.g., PRS) within a serving cell configuration, or the maximum number of distinct downlink reference signals that can be simultaneously used by the UE across all uplink reference signals (e.g., SRS) within the serving cell configuration, or the maximum number of distinct downlink reference signals that can be simultaneously used by the UE across all positioning reference signals (uplink or downlink) within the serving cell configuration. As noted above, in NR, the UE uses up to four downlink reference signals per serving cell for path loss estimation of all uplink signals (e.g., PUSCH, PUCCH, SRS, etc.). There is also currently an additional constraint on the maximum number of SRS for positioning configured as part of the serving cell configuration. For example, in a carrier aggregation case, the UE may have two component carriers, where each component carrier allows for four additional distinct downlink reference signals for SRS for positioning on top of the maximum four references used. This may be separate for all of the SRS resources for positioning, or all of the downlink positioning reference signal (e.g., PRS) resources. In contrast, the present disclosure sets a maximum number of distinct downlink reference signals that can be simultaneously used by the UE for uplink positioning reference signals only, and not for all uplink signals.

As an eighth option, the maximum could be the maximum number of distinct downlink reference signals that can be simultaneously used by the UE across all downlink positioning reference signals (e.g., PRS) configured for positioning purposes across all serving cell configurations, or the maximum number of distinct downlink reference signals that can be simultaneously used by the UE across all uplink reference signals (e.g., SRS) across all serving cell configurations, or the maximum number of distinct downlink reference signals that can be simultaneously used by the UE across all positioning reference signals (UL or DL) across all serving cell configurations. For example, in a carrier aggregation case, the UE may have two component carriers, and across both component carriers, four additional distinct downlink reference signals for the SRS for positioning may be allowed (on top of the four maximum downlink reference signals used per component carrier across the PUSCH/PUCCH/SRS). This may be separate for all of the SRS resources, or all downlink positioning reference signals (e.g., PRS) resources.

As a ninth option, the maximum could be a combination of the seventh and eighth option. Specifically, there may be two constraints on the maximum number of distinct uplink positioning reference signals that can be simultaneously used by the UE, a per-component carrier constraint (seventh option) and an across-component carriers constraint (eighth option).

In an aspect, not all downlink reference signals need to be counted towards the maximum number of distinct downlink reference signals that can be simultaneously used by the UE. More specifically, if there are downlink reference signals that the UE is already monitoring, then those signals may not need to be counted towards the maximum. As a first option, if the downlink reference signal used as a path loss reference and/or an uplink spatial transmit/receive beam reference is a downlink positioning reference signal (e.g., PRS), then the downlink positioning reference signal need not be counted towards the limit on the number of downlink reference signals that can be simultaneously used by the UE. As a second option, if the downlink reference signal is a CSI-RS or SSB that is used for positioning, then the downlink reference signal need not be counted towards the limit on the number of downlink reference signals that can be simultaneously used by the UE. As a third option, if the downlink reference signal is a CSI-RS or SSB that is used for any measurement (e.g., to derive CSI, TRS, RSRP, RSRQ, SINR, etc.), then the downlink positioning reference signal need not be counted towards the limit on the number of downlink reference signals that can be simultaneously used by the UE.

The present disclosure additionally addresses UE capability issues related to setting the maximum number of distinct downlink reference signals that can be simultaneously used by the UE. For a UE that supports uplink positioning procedures (e.g., multi-RTT, UL-TDOA), the above constraints (i.e., options one to nine) may complement the currently specified constraint of using up to four downlink reference signals per serving cell for PUSCH/PUCCH/SRS transmissions. For example, in addition to using up to the four downlink reference signals per serving cell for PUSCH/PUCCH/SRS transmissions, the UE can also use up to "N" downlink reference signals for positioning purposes according to any of the nine options described above. For different uplink positioning procedures, the UE may maintain a different maximum value "N" for any of the above options. For example, for E-CID positioning procedures, N can be 0, as there is no need for the UE to use more than the four downlink reference signals per serving cell. In contrast, for other positioning procedures, such as UL-TDOA, multi-RTT, AoA-based, etc., N would need to be at least three.

In an aspect, a different value of "N" may be used depending on whether the downlink reference signal is being used for path loss estimation, spatial transmit beam determination, or spatial receive beam determination. That is, the UE may use up to a first maximum number of downlink reference signals for path loss estimation, a second maximum number for spatial transmit beam determination, and a third maximum number for spatial receive beam determination. Additionally, a different value of "N" may be used depending on the band (e.g., TDD band, FDD band), or band combination, or whether the downlink reference signal is transmitted on a component carrier in FR1, FR2, FR3, or FR4.

In an aspect, the maximum number of distinct downlink reference signals that can be simultaneously used by the UE may be a UE capability, in which case, the UE would report this value to the serving base station or location server (e.g., location server 230, LMF 270). Alternatively, the maximum number may be specified in the applicable standard. As yet another alternative, the maximum number may be signaled by the serving base station or location server.

Figure 7:
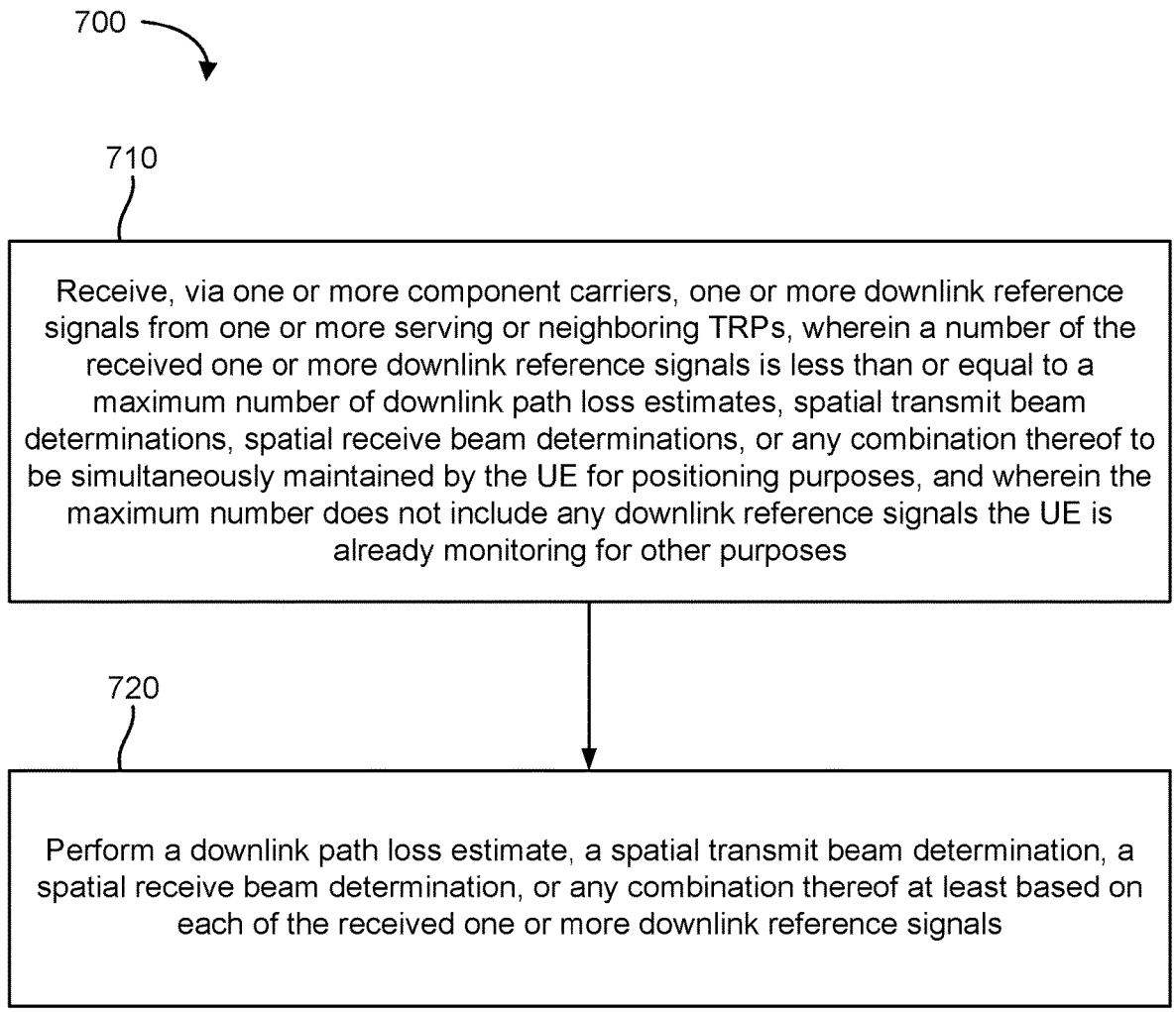
FIG. 7 illustrates an exemplary method of wireless communication, according to aspects of the disclosure.

FIG. 7 illustrates an exemplary method 700 of wireless communication, according to aspects of the disclosure. In an aspect, the method 700 may be performed by a UE (e.g., any of the UEs described herein).

At 710, the UE receives, via one or more component carriers (i.e., serving cells), one or more downlink reference signals (e.g., PRS, SSB, CSI-RS) from one or more serving or neighboring TRPs (e.g., TRPs of any of the base stations described above). In an aspect, the number of the received one or more downlink reference signals may be less than or equal to a maximum number of downlink path loss estimates, spatial transmit beam determinations, spatial receive beam determinations, or any combination thereof to be simultaneously maintained by the UE for positioning purposes. In an aspect, the maximum number does not include any downlink reference signals the UE is already monitoring for other purposes. In an aspect, operation 710 may be performed by WWAN transceiver 310, processing system 332, memory component 340, and/or positioning component 342, any or all of which may be considered means for performing this operation.

At 720, the UE performs a downlink path loss estimate, a spatial transmit beam determination, a spatial receive beam determination, or any combination thereof at least based on each of the received one or more downlink reference signals. In an aspect, operation 720 may be performed by WWAN transceiver 310, processing system 332, memory component 340, and/or positioning component 342, any or all of which may be considered means for performing this operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
   receiving, via one or more component carriers, one or more downlink reference signals from one or more serving or neighboring transmission-reception points (TRPs), wherein a number of the received one or more downlink reference signals is less than or equal to a maximum number of downlink path loss estimates, spatial transmit beam determinations, spatial receive beam determinations, or any combination thereof to be simultaneously maintained by the UE for positioning purposes, and wherein the maximum number of downlink path loss estimates, spatial transmit beam determinations, spatial receive beam determinations, or any combination thereof is in addition to a number of downlink reference signals the UE is already monitoring for physical uplink shared channel (PUSCH) transmissions, physical uplink control channel (PUCCH) transmissions, sounding reference signal (SRS) transmissions, or any combination thereof; and performing a downlink path loss estimate, a spatial transmit beam determination, a spatial receive beam determination, or any combination thereof at least based on each of the received one or more downlink reference signals.

2. The method of claim 1, wherein the maximum number of downlink path loss estimates, spatial transmit beam determinations, spatial receive beam determinations, or any combination thereof to be simultaneously maintained by the UE for positioning purposes corresponds to a maximum number of distinct downlink reference signals that can be simultaneously used by the UE for positioning purposes.

3. The method of claim 2, wherein the maximum number is a maximum number, within each of the one or more component carriers, of the distinct downlink reference signals to be simultaneously maintained by the UE for each of the one or more serving or neighboring TRPs.

4. The method of claim 2, wherein the maximum number is a maximum number of the distinct downlink reference signals to be simultaneously maintained by the UE across all of the one or more component carriers for each of the one or more serving or neighboring TRPs.

5. The method of claim 2, wherein the maximum number is a maximum number, within each of the one or more component carriers, of the distinct downlink reference signals to be simultaneously maintained by the UE across all of the one or more component carriers for each of the one or more serving or neighboring TRPs.

6. The method of claim 2, wherein the maximum number is a maximum number, within each of the one or more component carriers, of the distinct downlink reference signals to be simultaneously maintained by the UE for all of the one or more serving or neighboring TRPs operating on the one or more component carriers.

7. The method of claim 2, wherein the maximum number is a maximum number of the distinct downlink reference signals to be simultaneously maintained by the UE across all of the one or more component carriers for all of the one or more serving or neighboring TRPs.

8. The method of claim 2, wherein the maximum number is a maximum number, within each of the one or more component carriers, of the distinct downlink reference signals to be simultaneously maintained by the UE across all of the one or more component carriers for all of the one or more serving or neighboring TRPs.

9. The method of claim 2, wherein the maximum number is a maximum number of the distinct downlink reference signals to be simultaneously maintained by the UE across all downlink positioning reference signals received within each of the one or more component carriers, or a maximum number of the distinct downlink reference signals that can be simultaneously used by the UE across all uplink reference signals within each of the one or more component carriers, or a maximum number of the distinct downlink reference signals that can be simultaneously used by the UE across all positioning reference signals within each of the one or more component carriers.

10. The method of claim 2, wherein the maximum number is a maximum number of the distinct downlink reference signals to be simultaneously maintained by the UE across all downlink positioning reference signals received across all of the one or more component carriers, or a maximum number of the distinct downlink reference signals that can be simultaneously used by the UE across all uplink reference signals across all of the one or more component carriers, or a maximum number of the distinct downlink reference signals that can be simultaneously used by the UE across all positioning reference signals across all of the one or more component carriers.

11. The method of claim 2, wherein the maximum number is a maximum number of the distinct downlink reference signals to be simultaneously maintained by the UE across all downlink positioning reference signals or across all uplink reference signals or across all positioning reference signals received within each of the one or more component carriers and across all of the one or more component carriers.

12. The method of claim 1, wherein, in addition to the maximum number of downlink path loss estimates, spatial transmit beam determinations, spatial receive beam determinations, or any combination thereof, the UE can use up to N downlink reference signals for positioning purposes.

13. The method of claim 2, wherein, based on a received downlink reference signal being a downlink positioning reference signal, the received downlink reference signal is not counted toward the maximum number of distinct downlink reference signals to be simultaneously maintained by the UE.

14. The method of claim 2, wherein, based on a received downlink reference signal being a channel state information reference signal (CSI-RS) or a synchronization signal block (SSB) used for positioning purposes, the received downlink reference signal is not counted toward the maximum number of distinct downlink reference signals to be simultaneously maintained by the UE.

15. The method of claim 2, wherein, based on a received downlink reference signal being a CSI-RS or an SSB used for any purpose, the received downlink reference signal is not counted toward the maximum number of distinct downlink reference signals to be simultaneously maintained by the UE.

16. The method of claim 1, wherein the UE does not maintain more than the maximum number of downlink path loss estimates, spatial transmit beam determinations, spatial receive beam determinations, or any combination thereof for each of the one or more component carriers for each of the one or more serving or neighboring TRPs.

17. The method of claim 1, wherein the UE does not maintain more than the maximum number of downlink path loss estimates, spatial transmit beam determinations, spatial receive beam determinations, or any combination thereof across all of the one or more component carriers for each of the one or more serving or neighboring TRPs.

18. The method of claim 1, wherein the UE does not maintain more than the maximum number of downlink path loss estimates, spatial transmit beam determinations, spatial receive beam determinations, or any combination thereof for each of the one or more component carriers and across all of the one or more component carriers for each of the one or more serving or neighboring TRPs.

19. The method of claim 1, wherein the UE does not maintain more than the maximum number of downlink path loss estimates, spatial transmit beam determinations, spatial receive beam determinations, or any combination thereof for each of the one or more component carriers for all of the one or more serving or neighboring TRPs operating on a serving cell.

20. The method of claim 1, wherein the UE does not maintain more than the maximum number of downlink path loss estimates, spatial transmit beam determinations, spatial receive beam determinations, or any combination thereof across all of the one or more component carriers for all of the one or more serving or neighboring TRPs.

21. The method of claim 1, wherein the UE does not maintain more than the maximum number of downlink path loss estimates, spatial transmit beam determinations, spatial receive beam determinations, or any combination thereof for each of the one or more component carriers and across all of the one or more component carriers for all of the one or more serving or neighboring TRPs.

22. The method of claim 1, wherein the UE does not maintain more than the maximum number of downlink path loss estimates, spatial transmit beam determinations, spatial receive beam determinations, or any combination thereof across all downlink positioning reference signals received within each of the one or more component carriers.

23. The method of claim 1, wherein the UE does not maintain more than the maximum number of downlink path loss estimates, spatial transmit beam determinations, spatial receive beam determinations, or any combination thereof across all downlink positioning reference signals received across all of the one or more component carriers.

24. The method of claim 1, wherein the UE does not maintain more than the maximum number of downlink path loss estimates, spatial transmit beam determinations, spatial receive beam determinations, or any combination thereof across all downlink positioning reference signals received within each of the one or more component carriers and across all of the one or more component carriers.

25. The method of claim 1, wherein the maximum number is based on capabilities of the UE.

26. The method of claim 1, wherein the maximum number is specified in a wireless communications standard.

27. The method of claim 1, wherein the UE receives the maximum number from a serving base station or a location server.

28. The method of claim 1, wherein based on the positioning purposes being an uplink time difference of arrival (UL-TDOA) positioning procedure, a multi-round-trip-time (RTT) procedure, or an angle-of-arrival (AoA)-based positioning procedure, the maximum number is at least three.

29. The method of claim 1, wherein the maximum number varies based on whether the UE is performing the downlink path loss estimate, the spatial transmit beam determination, or the spatial receive beam determination.

30. The method of claim 1, wherein the maximum number varies based on types of bands or band combinations of the one or more component carriers.

31. The method of claim 30, wherein the types of bands comprise time division duplex bands, frequency division duplex bands, or any combination thereof.

32. The method of claim 1, wherein the maximum number varies based on whether the one or more downlink reference signals are received on a component carrier in frequency ranges (FRs) FR1, FR2, FR3, or FR4.

33. The method of claim 1, further comprising:
transmitting an uplink reference signal for positioning based on the estimated downlink path loss, the determined spatial transmit beam, or a combination thereof.

34. The method of claim 33, further comprising:
setting a spatial beam direction for a transmit beam directed toward the one or more serving or neighboring TRPs based on the spatial transmit beam determination, wherein the uplink reference signal is transmitted on the transmit beam.

35. The method of claim 33, wherein the uplink reference signal comprises a sounding reference signal (SRS) or an uplink positioning reference signal (UL PRS) used for positioning the UE.

36. The method of claim 1 further comprising:
receiving, from the one or more serving or neighboring TRPs on the one or more component carriers, one or more downlink positioning reference signals.

37. The method of claim 36, further comprising:
setting a spatial beam direction for a receive beam directed toward a neighboring base station based on the spatial receive beam determination, wherein the one or more downlink positioning reference signals are received on the receive beam.

38. The method of claim 36, wherein the one or more downlink positioning reference signals comprise one or more positioning reference signals (PRS), one or more navigation reference signals (NRS), one or more tracking reference signals (TRS), one or more cell-specific reference signals (CRS), one or more channel state information reference signals (CSI-RS), one or more primary synchronization signals (PSS), one or more secondary synchronization signals (SSS), or any combination thereof.

39. The method of claim 1, wherein the one or more downlink reference signals comprise one or more synchronization signal blocks (SSBs), one or more channel state information reference signals (CSI-RS), one or more positioning reference signals (PRS), or any combination thereof.

40. A user equipment (UE), comprising:
a memory;
at least one transceiver; and
at least one processor communicatively coupled to the memory and the at least one transceiver, the at least one processor configured to:
receive, via the at least one transceiver on one or more component carriers, one or more downlink reference signals from one or more serving or neighboring transmission-reception points (TRPs), wherein a number of the received one or more downlink reference signals is less than or equal to a maximum number of downlink path loss estimates, spatial transmit beam determinations, spatial receive beam determinations, or any combination thereof to be simultaneously maintained by the UE for positioning purposes, and wherein the maximum number of downlink path loss estimates, spatial transmit beam determinations, spatial receive beam determinations, or any combination thereof is in addition to a number of downlink reference signals the UE is already monitoring for physical uplink shared channel (PUSCH) transmissions, physical uplink control channel (PUCCH) transmissions, sounding reference signal (SRS) transmissions, or any combination thereof; and perform a downlink path loss estimate, a spatial transmit beam determination, a spatial receive beam determination, or any combination thereof at least based on each of the received one or more downlink reference signals.

41. The UE of claim 40, wherein the maximum number of downlink path loss estimates, spatial transmit beam determinations, spatial receive beam determinations, or any combination thereof to be simultaneously maintained by the UE for positioning purposes corresponds to a maximum number of distinct downlink reference signals that can be simultaneously used by the UE for positioning purposes.

42. The UE of claim 41, wherein the maximum number is a maximum number, within each of the one or more component carriers, of the distinct downlink reference signals to be simultaneously maintained by the UE for each of the one or more serving or neighboring TRPs.

43. The UE of claim 41, wherein the maximum number is a maximum number of the distinct downlink reference signals to be simultaneously maintained by the UE across all of the one or more component carriers for each of the one or more serving or neighboring TRPs.

44. The UE of claim 41, wherein the maximum number is a maximum number, within each of the one or more component carriers, of the distinct downlink reference signals to be simultaneously maintained by the UE across all of the one or more component carriers for each of the one or more serving or neighboring TRPs.

45. The UE of claim 41, wherein the maximum number is a maximum number, within each of the one or more component carriers, of the distinct downlink reference signals to be simultaneously maintained by the UE for all of the one or more serving or neighboring TRPs operating on the one or more component carriers.

46. The UE of claim 41, wherein the maximum number is a maximum number of the distinct downlink reference signals to be simultaneously maintained by the UE across all of the one or more component carriers for all of the one or more serving or neighboring TRPs.

47. The UE of claim 41, wherein the maximum number is a maximum number, within each of the one or more component carriers, of the distinct downlink reference signals to be simultaneously maintained by the UE across all of the one or more component carriers for all of the one or more serving or neighboring TRPs.

48. The UE of claim 41, wherein the maximum number is a maximum number of the distinct downlink reference signals to be simultaneously maintained by the UE across all downlink positioning reference signals received within each of the one or more component carriers, or a maximum number of the distinct downlink reference signals that can be simultaneously used by the UE across all uplink reference signals within each of the one or more component carriers, or a maximum number of the distinct downlink reference signals that can be simultaneously used by the UE across all positioning reference signals within each of the one or more component carriers.

49. The UE of claim 41, wherein the maximum number is a maximum number of the distinct downlink reference signals to be simultaneously maintained by the UE across all downlink positioning reference signals received across all of the one or more component carriers, or a maximum number of the distinct downlink reference signals that can be simultaneously used by the UE across all uplink reference signals across all of the one or more component carriers, or a maximum number of the distinct downlink reference signals that can be simultaneously used by the UE across all positioning reference signals across all of the one or more component carriers.

50. The UE of claim 41, wherein the maximum number is a maximum number of the distinct downlink reference signals to be simultaneously maintained by the UE across all downlink positioning reference signals or across all uplink reference signals or across all positioning reference signals received within each of the one or more component carriers and across all of the one or more component carriers.

51. The UE of claim 40, wherein, in addition to the maximum number of downlink path loss estimates, spatial transmit beam determinations, spatial receive beam determinations, or any combination thereof, the UE can use up to N downlink reference signals for positioning purposes.

52. The UE of claim 41, wherein, based on a received downlink reference signal being a downlink positioning reference signal, the received downlink reference signal is not counted toward the maximum number of distinct downlink reference signals to be simultaneously maintained by the UE.

53. The UE of claim 41, wherein, based on a received downlink reference signal being a channel state information reference signal (CSI-RS) or a synchronization signal block (SSB) used for positioning purposes, the received downlink reference signal is not counted toward the maximum number of distinct downlink reference signals to be simultaneously maintained by the UE.

54. The UE of claim 41, wherein, based on a received downlink reference signal being a CSI-RS or an SSB used for any purpose, the received downlink reference signal is not counted toward the maximum number of distinct downlink reference signals to be simultaneously maintained by the UE.

55. The UE of claim 40, wherein the UE does not maintain more than the maximum number of downlink path loss estimates, spatial transmit beam determinations, spatial receive beam determinations, or any combination thereof for each of the one or more component carriers for each of the one or more serving or neighboring TRPs.

56. The UE of claim 40, wherein the UE does not maintain more than the maximum number of downlink path loss estimates, spatial transmit beam determinations, spatial receive beam determinations, or any combination thereof across all of the one or more component carriers for each of the one or more serving or neighboring TRPs.

57. The UE of claim 40, wherein the UE does not maintain more than the maximum number of downlink path loss estimates, spatial transmit beam determinations, spatial receive beam determinations, or any combination thereof for each of the one or more component carriers and across all of the one or more component carriers for each of the one or more serving or neighboring TRPs.

58. The UE of claim 40, wherein the UE does not maintain more than the maximum number of downlink path loss estimates, spatial transmit beam determinations, spatial receive beam determinations, or any combination thereof for each of the one or more component carriers for all of the one or more serving or neighboring TRPs operating on a serving cell.

59. The UE of claim 40, wherein the UE does not maintain more than the maximum number of downlink path loss estimates, spatial transmit beam determinations, spatial receive beam determinations, or any combination thereof across all of the one or more component carriers for all of the one or more serving or neighboring TRPs.

60. The UE of claim 40, wherein the UE does not maintain more than the maximum number of downlink path loss estimates, spatial transmit beam determinations, spatial receive beam determinations, or any combination thereof for each of the one or more component carriers and across all of the one or more component carriers for all of the one or more serving or neighboring TRPs.

61. The UE of claim 40, wherein the UE does not maintain more than the maximum number of downlink path loss estimates, spatial transmit beam determinations, spatial receive beam determinations, or any combination thereof across all downlink positioning reference signals received within each of the one or more component carriers.

62. The UE of claim 40, wherein the UE does not maintain more than the maximum number of downlink path loss estimates, spatial transmit beam determinations, spatial receive beam determinations, or any combination thereof across all downlink positioning reference signals received across all of the one or more component carriers.

63. The UE of claim 40, wherein the UE does not maintain more than the maximum number of downlink path loss estimates, spatial transmit beam determinations, spatial receive beam determinations, or any combination thereof across all downlink positioning reference signals received within each of the one or more component carriers and across all of the one or more component carriers.

64. The UE of claim 40, wherein the maximum number is based on capabilities of the UE.

65. The UE of claim 40, wherein the maximum number is specified in a wireless communications standard.

66. The UE of claim 40, wherein the UE receives the maximum number from a serving base station or a location server.

67. The UE of claim 40, wherein based on the positioning purposes being an uplink time difference of arrival (UL-TDOA) positioning procedure, a multi-round-trip-time (RTT) procedure, or an angle-of-arrival (AoA)-based positioning procedure, the maximum number is at least three.

68. The UE of claim 40, wherein the maximum number varies based on whether the UE is performing the downlink path loss estimate, the spatial transmit beam determination, or the spatial receive beam determination.

69. The UE of claim 40, wherein the maximum number varies based on types of bands or band combinations of the one or more component carriers.

70. The UE of claim 69, wherein the types of bands comprise time division duplex bands, frequency division duplex bands, or any combination thereof.

71. The UE of claim 40, wherein the maximum number varies based on whether the one or more downlink reference signals are received on a component carrier in frequency ranges (FRs) FR1, FR2, FR3, or FR4.

72. The UE of claim 40, wherein the at least one processor is further configured to:
cause the at least one transceiver to transmit an uplink reference signal for positioning based on the estimated downlink path loss, the determined spatial transmit beam, or a combination thereof.

73. The UE of claim 72, wherein the at least one processor is further configured to:
set a spatial beam direction for a transmit beam directed toward the one or more serving or neighboring TRPs based on the spatial transmit beam determination, wherein the uplink reference signal is transmitted on the transmit beam.

74. The UE of claim 72, wherein the uplink reference signal comprises a sounding reference signal (SRS) or an uplink positioning reference signal (UL PRS) used for positioning the UE.

75. The UE of claim 40, wherein the at least one processor is further configured to:
receive, via the at least one transceiver from the one or more serving or neighboring TRPs on the one or more component carriers, one or more downlink positioning reference signals.

76. The UE of claim 75, wherein the at least one processor is further configured to:
set a spatial beam direction for a receive beam directed toward a neighboring base station based on the spatial receive beam determination, wherein the one or more downlink positioning reference signals are received on the receive beam.

77. The UE of claim 75, wherein the one or more downlink positioning reference signals comprise one or more positioning reference signals (PRS), one or more navigation reference signals (NRS), one or more tracking reference signals (TRS), one or more cell-specific reference signals (CRS), one or more channel state information reference signals (CSI-RS), one or more primary synchronization signals (PSS), one or more secondary synchronization signals (SSS), or any combination thereof.

78. The UE of claim 40, wherein the one or more downlink reference signals comprise one or more synchronization signal blocks (SSBs), one or more channel state information reference signals (CSI-RS), one or more positioning reference signals (PRS), or any combination thereof.

79. A user equipment (UE), comprising:
means for receiving, via one or more component carriers, one or more downlink reference signals from one or more serving or neighboring transmission-reception points (TRPs), wherein a number of the received one or more downlink reference signals is less than or equal to a maximum number of downlink path loss estimates, spatial transmit beam determinations, spatial receive beam determinations, or any combination thereof to be simultaneously maintained by the UE for positioning purposes, and wherein the maximum number of downlink path loss estimates, spatial transmit beam determinations, spatial receive beam determinations, or any combination thereof is in addition to a number of downlink reference signals the UE is already monitoring for physical uplink shared channel (PUSCH) transmissions, physical uplink control channel (PUCCH) transmissions, sounding reference signal (SRS) transmissions, or any combination thereof; and
means for performing a downlink path loss estimate, a spatial transmit beam determination, a spatial receive beam determination, or any combination thereof at least based on each of the received one or more downlink reference signals.

80. A non-transitory computer-readable medium storing computer-executable instructions, the computer-executable instructions comprising:
at least one instruction instructing a user equipment (UE) to receive, via one or more component carriers, one or more downlink reference signals from one or more serving or neighboring transmission-reception points (TRPs), wherein a number of the received one or more downlink reference signals is less than or equal to a maximum number of downlink path loss estimates, spatial transmit beam determinations, spatial receive beam determinations, or any combination thereof to be simultaneously maintained by the UE for positioning purposes, and wherein the maximum number of downlink path loss estimates, spatial transmit beam determinations, spatial receive beam determinations, or any combination thereof is in addition to a number of downlink reference signals the UE is already monitoring for physical uplink shared channel (PUSCH) transmissions, physical uplink control channel (PUCCH) transmissions, sounding reference signal (SRS) transmissions, or any combination thereof; and at least one instruction instructing the UE to perform a downlink path loss estimate, a spatial transmit beam determination, a spatial receive beam determination, or any combination thereof at least based on each of the received one or more downlink reference signals.

* * * * *